United States Patent
Hsu et al.

(10) Patent No.: US 9,250,420 B2
(45) Date of Patent: Feb. 2, 2016

(54) OPTICAL IMAGE CAPTURING SYSTEM, IMAGE CAPTURING DEVICE AND MOBILE TERMINAL

(71) Applicant: LARGAN PRECISION CO., LTD., Taichung (TW)

(72) Inventors: Po-Lun Hsu, Taichung (TW); Cheng-Chen Lin, Taichung (TW); Lin-Yao Liao, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 121 days.

(21) Appl. No.: 14/064,213

(22) Filed: Oct. 28, 2013

(65) Prior Publication Data

US 2015/0103225 A1  Apr. 16, 2015

(30) Foreign Application Priority Data

Oct. 14, 2013  (TW) .............................. 102137030 A

(51) Int. Cl.
*G02B 13/18* (2006.01)
*G02B 9/60* (2006.01)
*G02B 13/00* (2006.01)

(52) U.S. Cl.
CPC .............. *G02B 13/0045* (2013.01); *G02B 9/60* (2013.01); *G02B 13/002* (2013.01); *G02B 13/18* (2013.01)

(58) Field of Classification Search
CPC ........... G02B 13/0015; G02B 13/0045; G02B 13/04; G02B 13/143; G02B 13/16; G02B 13/18; G02B 13/24; G02B 9/60
See application file for complete search history.

(56) References Cited

U.S. PATENT DOCUMENTS

| 7,443,610 | B1 * | 10/2008 | Lin et al. ........................ 359/714 |
| 7,639,432 | B2 * | 12/2009 | Asami ............................ 359/770 |
| 8,437,092 | B2 * | 5/2013 | Baba ............................... 359/767 |
| 8,649,113 | B1 * | 2/2014 | Tsai et al. ...................... 359/714 |
| 2012/0154929 | A1 * | 6/2012 | Tsai et al. ...................... 359/714 |
| 2014/0211328 | A1 | 7/2014 | Hashimoto et al. |

FOREIGN PATENT DOCUMENTS

| CN | 203606559 U | 5/2014 |
| JP | 2010026434 A | 2/2010 |

\* cited by examiner

*Primary Examiner* — Thong Nguyen
(74) *Attorney, Agent, or Firm* — CKC & Partners Co., Ltd.

(57) ABSTRACT

An optical image capturing system includes, in order from an object side to an image side, a first lens element, a second lens element, a third lens element, a fourth lens element and a fifth lens element. The first lens element with refractive power has a convex object-side surface in a paraxial region thereof and a concave image-side surface in a paraxial region thereof. The second lens element has positive refractive power. The third lens element with negative refractive power has a concave image-side surface in a paraxial region thereof. The fourth lens element with positive refractive power has a convex image-side surface in a paraxial region thereof. The fifth lens element with negative refractive power has a concave image-side surface in a paraxial region thereof, wherein the surfaces thereof are aspheric. The optical image capturing system has a total of five lens elements with refractive power.

21 Claims, 25 Drawing Sheets

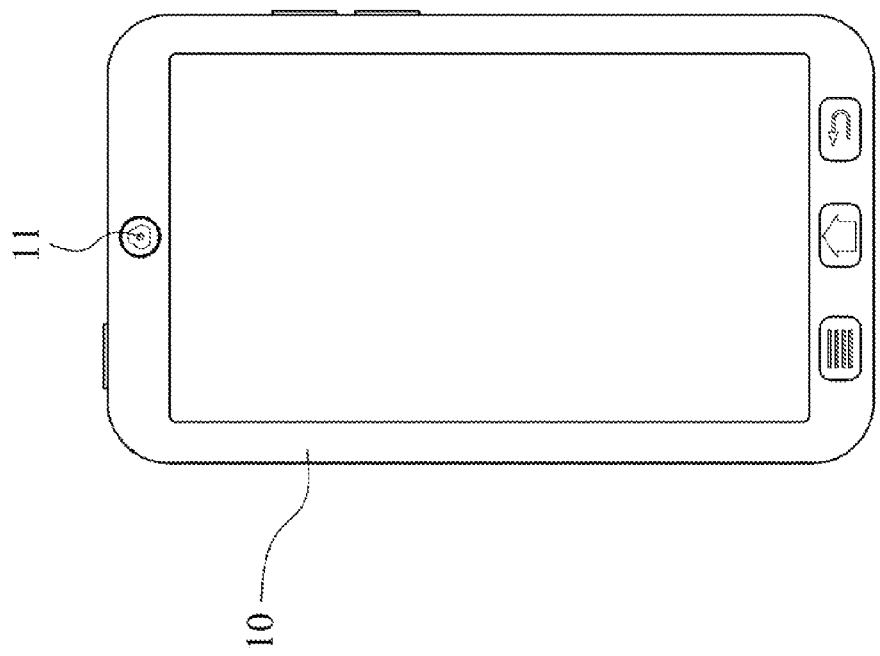

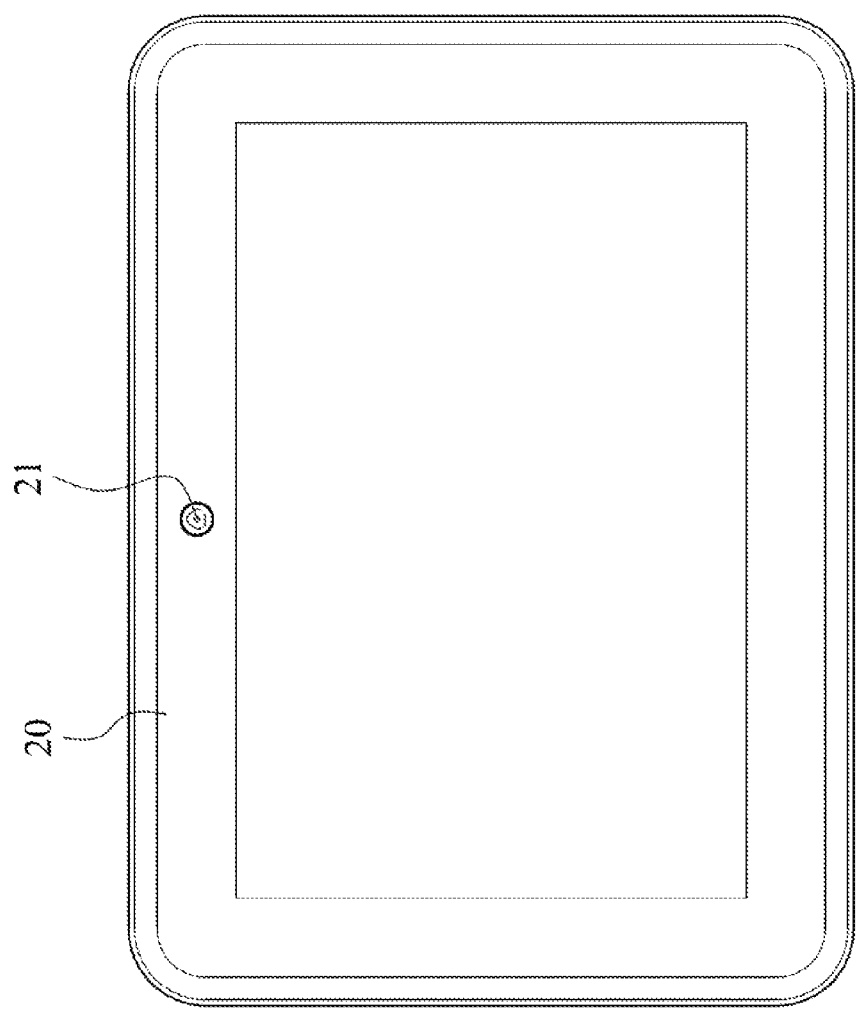

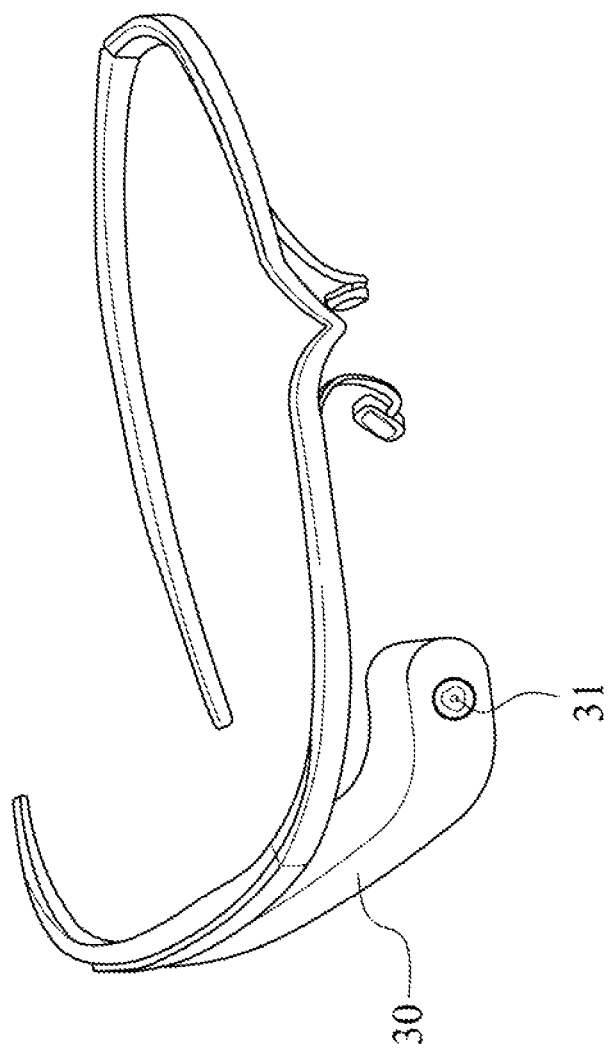

)# OPTICAL IMAGE CAPTURING SYSTEM, IMAGE CAPTURING DEVICE AND MOBILE TERMINAL

RELATED APPLICATIONS

This application claims priority to Taiwan Application Serial Number 102137030, filed Oct. 14, 2013, which is incorporated by reference herein in its entirety.

BACKGROUND

1. Technical Field

The present disclosure relates to an optical image capturing system.

More particularly, the present disclosure relates to a compact optical image capturing system applicable to a mobile terminal.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Although other conventional optical systems with five-element lens structure enhances image quality; however, the arrangement of the positive refractive power is not favorable for providing wide viewing angle and large aperture. Moreover, it is also not favorable for reducing the photosensitivity of the optical systems which thereby influence image quality.

SUMMARY

According to one aspect of the present disclosure, an optical image capturing system includes, in order from an object side to an image side, a first lens element, a second lens element, a third lens element, a fourth lens element and a fifth lens element. The first lens element with refractive power has an object-side surface being convex in a paraxial region thereof and an image-side surface being concave in a paraxial region thereof. The second lens element has positive refractive power. The third lens element with negative refractive power has an image-side surface being concave in a paraxial region thereof. The fourth lens element with positive refractive power has an image-side surface being convex in a paraxial region thereof. The fifth lens element with negative refractive power has an image-side surface being concave in a paraxial region thereof, wherein both of an object-side surface and the image-side surface of the fifth lens element are aspheric, and the image-side surface of the fifth lens element has at least one inflection point. The optical image capturing system has a total of five lens elements with refractive power. When a focal length of the second lens element is f2, a focal length of the fourth lens element is f4, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following conditions are satisfied:

$$0 < f2/f4 < 1.20; \text{ and}$$

$$1.05 < T34/(T12 + T23 + T45).$$

According to another aspect of the present disclosure, an image capturing device includes the optical image capturing system according to the aforementioned aspect and an image sensor, wherein the image sensor is located on an image plane of the optical image capturing system.

According to still another aspect of the present disclosure, a mobile terminal includes the image capturing device according to the foregoing aspect.

According to yet another aspect of the present disclosure, an optical image capturing system includes, in order from an object side to an image side, a first lens element, a second lens element, a third lens element, a fourth lens element and a fifth lens element. The first lens element with refractive power has an object-side surface being convex in a paraxial region thereof. The second lens element has positive refractive power. The third lens element with negative refractive power has an image-side surface being concave in a paraxial region thereof. The fourth lens element with positive refractive power has an image-side surface being convex in a paraxial region thereof. The fifth lens element with negative refractive power has an image-side surface being concave in a paraxial region thereof, wherein both of an object-side surface and the image-side surface of the fifth lens element are aspheric, and the image-side surface of the fifth lens element has at least one inflection point. The optical image capturing system has a total of five lens elements with refractive power. When a focal length of the second lens element is f2, a focal length of the fourth lens element is f4, a focal length of the fifth lens element is f5, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following conditions are satisfied:

$$0 < f2/f4 < 1.2;$$

$$1.05 < T34/(T12 + T23 + T45); \text{ and}$$

$$-0.95 < f2/f5 < 0.$$

BRIEF DESCRIPTION OF THE DRAWINGS

The disclosure can be more fully understood by reading the following detailed description of the embodiment, with reference made to the accompanying drawings as follows:

FIG. 23 shows an image capturing device according to the 12th embodiment;

FIG. 24 shows an image capturing device according to the 13th embodiment; and

FIG. 25 shows an image capturing device according to the 14th embodiment.

DETAILED DESCRIPTION

Figure 1:
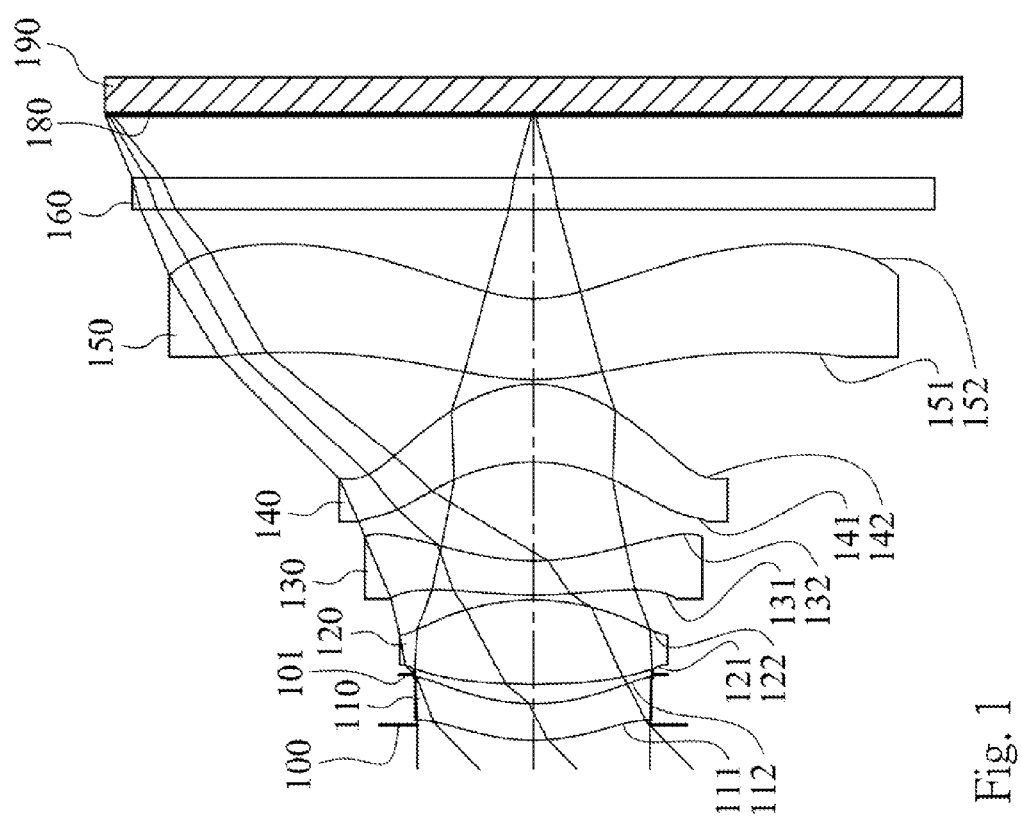
FIG. 1 is a schematic view of an image capturing device according to the 1st embodiment of the present disclosure.

An optical image capturing system includes, in order from an object side to an image side, a first lens element, a second lens element, a third lens element, a fourth lens element and a fifth lens element. The optical image capturing system has a total of five lens elements with refractive power.

The first lens element with refractive power has an object-side surface being convex in a paraxial region thereof and an image-side surface being concave in a paraxial region thereof, so that it is favorable for balancing the distribution of the main refractive powers of the optical image capturing system.

The second lens element with positive refractive power can have an image-side surface being convex in a paraxial region thereof. Therefore, it is favorable for reducing the total track length of the optical image capturing system and spherical aberration The third lens element with negative refractive power has an image-side surface being concave in a paraxial region thereof, so that it is favorable for correcting the aberration of the optical image capturing system.

The fourth lens element with positive refractive power has an image-side surface being convex in a paraxial region thereof, so that it is favorable for reducing the photosensitivity of the optical image capturing system.

The fifth lens element with negative refractive power can have an object-side surface being convex in a paraxial region thereof and has an image-side surface being concave in a paraxial region thereof. Therefore, the principal point can be positioned away from the image plane of the optical image capturing system so as to reduce the back focal length for keeping a compact size. The image-side surface of the fifth lens element has at least one inflection point, so that it is favorable for reducing the incident angle of the light projecting onto an image sensor so as to increase the responding efficiency of the image sensor.

When a focal length of the second lens element is f2, and a focal length of the fourth lens element is f4, the following condition is satisfied: $0 < f2/f4 < 1.2$. Therefore, it is favorable for providing wide viewing angle, large aperture and reducing the photosensitivity for the optical image capturing system. It is also favorable for manufacturing the lens elements and improving the manufacturing yield rate. Preferably, the following condition is satisfied: $0.5 < f2/f4 < 1.0$.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition is satisfied: $1.05 < T34/(T12+T23+T45)$. Therefore, it is favorable for properly adjusting the axial distance between every lens elements so as to reduce the total track length for keeping the optical image capturing system compact. Preferably, the following condition is satisfied: $1.5 < T34/(T12+T23+T45) < 4.0$.

When the focal length of the second lens element is f2, and a focal length of the fifth lens element is f5, the following condition is satisfied: $-0.95 < f2/f5 < 0$. Therefore, it is favorable for reducing the total track length of the optical image capturing system. Preferably, the following condition is satisfied: $-0.85 < f2/f5 < 0$.

When a curvature radius of the object-side surface of the third lens element is R5, and a curvature radius of the image-side surface of the third lens element is R6, the following condition is satisfied: $0 < (R5+R6)/(R5-R6) < 5.0$. Therefore, it is favorable for correcting the aberration.

When an Abbe number of the second lens element is V2, and an Abbe number of the third lens element is V3, the following condition is satisfied: $28.0 < V2-V3 < 40.0$. Therefore, the chromatic aberration of the optical image capturing system can be corrected.

When a curvature radius of the object-side surface of the first lens element is R1, and a curvature radius of the image-side surface of the first lens element is R2, the following condition is satisfied: $0.7 < R1/R2 < 1.25$. Therefore, it is favorable for reducing the astigmatism and spherical aberration.

When an Abbe number of the fourth lens element is V4, and an Abbe number of the fifth lens element is V5, the following condition is satisfied: 2.0<V4/V5<3.5. Therefore, it is favorable for further correcting the chromatic aberration of the optical image capturing system.

When an f-number of the optical image capturing system is Fno, and the following condition is satisfied: 1.5<Fno≤2.25. Therefore, the optical image capturing system can obtain a large aperture.

When a focal length of the optical image capturing system is f, the focal length of the fourth lens element is f4, and a focal length of the fifth lens element is f5, the following condition is satisfied: 1.0<f/f4+|f/f5|<2.0. Therefore, it is favorable for reducing the total track length of the optical image capturing system so as to keep a compact size and reduce the photosensitivity thereof.

When a maximal field of view of the optical image capturing system is FOV, and the following condition is satisfied: 75 degrees<FOV<105 degrees. Therefore, it is favorable for enlarging the field of view so as to obtain a larger image scene.

When a curvature radius of the object-side surface of the second lens element is R3, and a curvature radius of the image-side surface of the second lens element is R4, the following condition is satisfied: −0.5<(R3+R4)/(R3−R4)<2.0. Therefore, it is favorable for correcting the spherical aberration and astigmatism of the optical image capturing system.

According to the optical image capturing system of the present disclosure, at least four lens elements among the first through the fifth lens elements has at least one inflection point on at least one of the object-side surface and the image-side surface. Therefore, it is favorable for correcting the aberration of the off-axis so as to improve the image quality.

According to the optical image capturing system of the present disclosure, the lens elements thereof can be made of glass or plastic material. When the lens elements are made of glass material, the distribution of the refractive power of the optical image capturing system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical image capturing system can also be reduced.

According to the optical image capturing system of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the optical image capturing system of the present disclosure, the optical image capturing system can include at least one stop, such as an aperture stop, a glare stop or a field stop. Said glare stop or said field stop is for eliminating the stray light and thereby improving the image resolution thereof.

According to the optical image capturing system of the present disclosure, an aperture stop can be configured as a front stop or a middle stop. A front stop disposed between an imaged object and the first lens element can provide a longer distance between an exit pupil of the optical image capturing system and the image plane and thereby improves the image-sensing efficiency of an image sensor. A middle stop disposed between the first lens element and the image plane is favorable for enlarging the field of view of the optical image capturing system and thereby provides a wider field of view for the same.

The present optical image capturing system can be optionally applied to moving focus optical systems. According to the optical image capturing system of the present disclosure, the optical image capturing system is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the optical image capturing system according to the aforementioned optical image capturing system of the present disclosure, and an image sensor, wherein the image sensor is disposed on an image plane of the aforementioned optical image capturing system. Therefore, the image capturing device can obtain wide viewing angle, large aperture and low photosensitivity. Preferably, the image capturing device can further include a barrel member, a holding member or a combination thereof.

According to the present disclosure, a mobile terminal is provided, wherein the mobile terminal includes the aforementioned image capturing device. Therefore, it is favorable for the mobile terminal obtaining good image quality. Preferably, the mobile terminal can further include but not limited to display, control unit, random access memory unit (RAM) a read only memory unit (ROM) or a combination thereof.

According to the above description of the present disclosure, the following 1st-11th specific embodiments are provided for further explanation.

1st Embodiment

Figure 2:
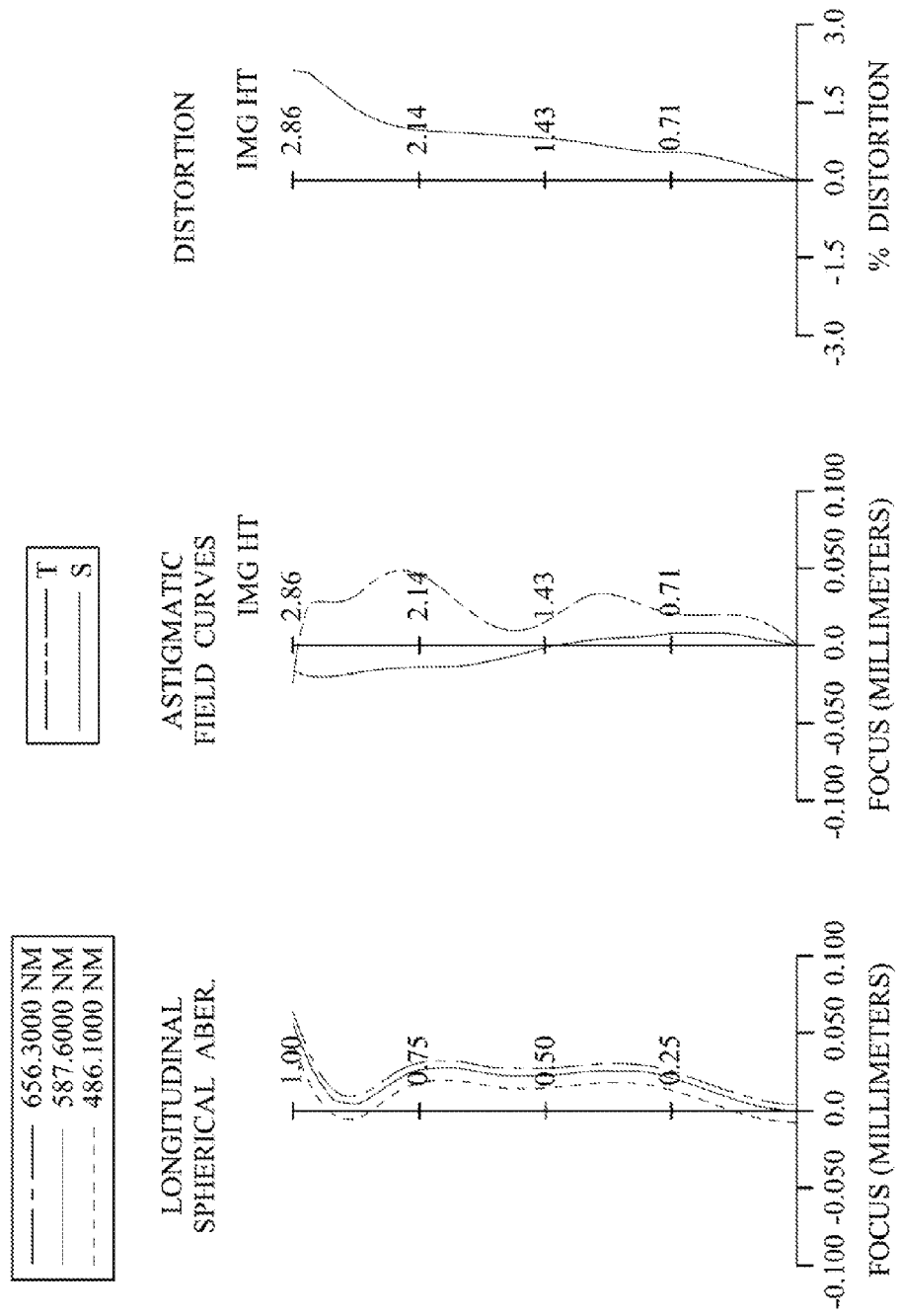
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment.

In FIG. 1, the image capturing device includes the optical image capturing system (not otherwise herein labeled) of the present disclosure and an image sensor 190. The optical image capturing system includes, in order from an object side to an image side, an aperture stop 100, a first lens element 110, a stop 101, a second lens element 120, a third lens element 130, a fourth lens element 140, a fifth lens element 150, an IR-cut filter 160 and an image plane 180, wherein the optical image capturing system has a total of five lens elements (110-150) with refractive power.

The first lens element 110 with positive refractive power has an object-side surface 111 being convex in a paraxial region thereof and an image-side surface 112 being concave in a paraxial region thereof, and is made of plastic material. The object-side surface 111 and the image-side surface 112 of the first lens element 110 are aspheric. Furthermore, both of the object-side surface 111 and the image-side surface 112 of the first lens element 110 have at least one inflection point.

The second lens element 120 with positive refractive power has an object-side surface 121 being convex in a paraxial region thereof and an image-side surface 122 being convex in a paraxial region thereof, and is made of plastic material. The object-side surface 121 and the image-side surface 122 of the second lens element 120 are aspheric. Furthermore, the image-side surface 122 of the second lens element 120 has at least one inflection point.

The third lens element 130 with negative refractive power has an object-side surface 131 being convex in a paraxial region thereof and an image-side surface 132 being concave in a paraxial region thereof, and is made of plastic material. The object-side surface 131 and the image-side surface 132 of the third lens element 130 are aspheric. Furthermore, both of the object-side surface 131 and the image-side surface 132 of the third lens element 130 have at least one inflection point.

The fourth lens element 140 with positive refractive power has an object-side surface 141 being concave in a paraxial region thereof and an image-side surface 142 being convex in a paraxial region thereof, and is made of plastic material. The object-side surface 141 and the image-side surface 142 of the fourth lens element 140 are aspheric. Furthermore, both of the object-side surface 141 and the image-side surface 142 of the fourth lens element 140 have at least one inflection point.

The fifth lens element 150 with negative refractive power has an object-side surface 151 being convex in a paraxial region thereof and an image-side surface 152 being concave in a paraxial region thereof, and is made of plastic material. The object-side surface 151 and the image-side surface 152 of the fifth lens element 150 are aspheric. Furthermore, both of the object-side surface 151 and the image-side surface 152 of the fifth lens element 150 have at least one inflection point.

The IR-cut filter 160 is made of glass and located between the fifth lens element 150 and the image plane 180, and will not affect the focal length of the optical image capturing system. The image sensor 190 is disposed on the image plane 180 of the optical image capturing system.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical image capturing system of the image capturing device according to the 1st embodiment, when a focal length of the optical image capturing system is f, an f-number of the optical image capturing system is Fno, and half of a maximal field of view of the optical image capturing system is HFOV, these parameters have the following values: f=2.89 mm; Fno=1.85; and HFOV=43.9 degrees.

In the optical image capturing system of the image capturing device according to the 1st embodiment, when an Abbe number of the second lens element 120 is V2, an Abbe number of the third lens element 130 is V3, an Abbe number of the fourth lens element 140 is V4, and an Abbe number of the fifth lens element 150 is V5, the following conditions are satisfied: V2−V3=32.6; and V4/V5=2.40.

In the optical image capturing system according to the 1st embodiment, an axial distance between the first lens element 110 and the second lens element 120 is T12, an axial distance between the second lens element 120 and the third lens element 130 is T23, an axial distance between the third lens element 130 and the fourth lens element 140 is T34, and an axial distance between the fourth lens element 140 and the fifth lens element 150 is T45, the following condition is satisfied: T34/(T12+T23+T45)=3.48.

In the optical image capturing system of the image capturing device according to the 1st embodiment, when a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 131 of the third lens element 130 is R5, and a curvature radius of the image-side surface 132 of the third lens element 130 is R6, the following conditions are satisfied: R1/R2=1.03; (R3+R4)/(R3−R4)=0.49; and (R5+R6)/(R5−R6)=2.78.

In the optical image capturing system of the image capturing device according to the 1st embodiment, when a focal length of the second lens element 120 is f2, a focal length of the fourth lens element 140 is f4, and a focal length of the fifth lens element 150 is f5, the following conditions are satisfied: f2/f4=0.73; and f2/f5=−0.59.

In the optical image capturing system according to the 1st embodiment, a focal length of the optical image capturing system is f, the focal length of the fourth lens element 140 is f4, and the focal length of the fifth lens element 150 is f5, the following condition is satisfied: f/f4+|f/f5|=1.78.

In the optical image capturing system of the image capturing device according to the 1st embodiment, when a maximal field of view of the optical image capturing system is FOV, the following condition is satisfied: FOV=87.8 degrees.

The detailed optical data of the 1st embodiment are shown in Table 1 and the aspheric surface data are shown in Table 2 below.

TABLE 1

1st Embodiment
f = 2.89 mm, Fno = 1.85, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.103 | | | | |
| 2 | Lens 1 | 1.428 | ASP | 0.241 | Plastic | 1.544 | 55.9 | 96.64 |
| 3 | | 1.380 | ASP | 0.195 | | | | |
| 4 | Stop | Plano | | −0.064 | | | | |
| 5 | Lens 2 | 4.474 | ASP | 0.569 | Plastic | 1.544 | 55.9 | 2.16 |
| 6 | | −1.522 | ASP | 0.030 | | | | |

TABLE 1-continued

1st Embodiment
f = 2.89 mm, Fno = 1.85, HFOV = 43.9 deg.

| Surface # | | Curvature Radius | | Thickness | Material | Index | Abbe # | Focal Length |
|---|---|---|---|---|---|---|---|---|
| 7 | Lens 3 | 3.032 | ASP | 0.230 | Plastic | 1.640 | 23.3 | −4.46 |
| 8 | | 1.427 | ASP | 0.665 | | | | |
| 9 | Lens 4 | −1.136 | ASP | 0.527 | Plastic | 1.544 | 55.9 | 2.94 |
| 10 | | −0.773 | ASP | 0.030 | | | | |
| 11 | Lens 5 | 1.887 | ASP | 0.544 | Plastic | 1.640 | 23.3 | −3.64 |
| 12 | | 0.925 | ASP | 0.600 | | | | |
| 13 | IR-cut filter | Plano | | 0.210 | Glass | 1.517 | 64.2 | — |
| 14 | | Plano | | 0.428 | | | | |
| 15 | Image | Plano | | — | | | | |

Note:
Reference wavelength is 587.6 nm (d-line).
The effective radius of Surface 4 (stop) is 0.800 mm.

TABLE 2

Aspheric Coefficients

| Surface # | 2 | 3 | 5 | 6 | 7 |
|---|---|---|---|---|---|
| k = | −2.2674E+00 | −7.1903E−01 | −9.9000E+01 | −8.2943E+00 | −7.1335E+00 |
| A4 = | −3.3778E−02 | −9.5008E−04 | 1.7270E−01 | −1.7255E−01 | −1.9090E−01 |
| A6 = | 2.9566E−02 | −9.1849E−02 | −1.3872E−01 | −1.4313E−01 | 7.1017E−02 |
| A8 = | −8.3571E−01 | −4.7355E−01 | −2.5014E−01 | 1.0022E+00 | −6.3821E−02 |
| A10 = | 1.0942E+00 | 8.7037E−01 | 1.6099E+00 | −2.5049E+00 | −1.5437E−01 |
| A12 = | −6.7890E−01 | −6.6564E−01 | −2.1622E+00 | 3.1061E+00 | 5.0524E−01 |
| A14 = | | | 9.3497E−01 | −1.2953E+00 | −3.7850E−01 |

| Surface # | 8 | 9 | 10 | 11 | 12 |
|---|---|---|---|---|---|
| k = | −1.6495E+00 | −2.4482E+00 | −1.4372E+00 | −1.2409E+00 | −5.7696E+00 |
| A4 = | −2.9438E−01 | 1.5649E−02 | 1.7451E−01 | −2.0774E−01 | −7.1913E−02 |
| A6 = | 4.4999E−01 | −4.2104E−01 | −6.8025E−01 | 1.3401E−01 | 3.5796E−02 |
| A8 = | −7.3205E−01 | 1.0388E+00 | 1.3020E+00 | −6.3093E−02 | −1.3126E−02 |
| A10 = | 7.8588E−01 | −1.2602E+00 | −1.5723E+00 | 1.9169E−02 | 2.9407E−03 |
| A12 = | −4.4146E−01 | 1.0086E+00 | 1.1906E+00 | −3.4638E−03 | −3.9837E−04 |
| A14 = | 8.9052E−02 | −4.4227E−01 | −4.6730E−01 | 3.3763E−04 | 3.1869E−05 |
| A16 = | | 7.1003E−02 | 7.1210E−02 | −1.3848E−05 | −1.2626E−06 |

In Table 1, the curvature radius, the thickness and the focal length are shown in millimeters (mm). Surface numbers 0-15 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. This information related to Table 1 and Table 2 applies also to the Tables for the remaining embodiments, and so an explanation in this regard will not be provided again.

2nd Embodiment

Figure 3:
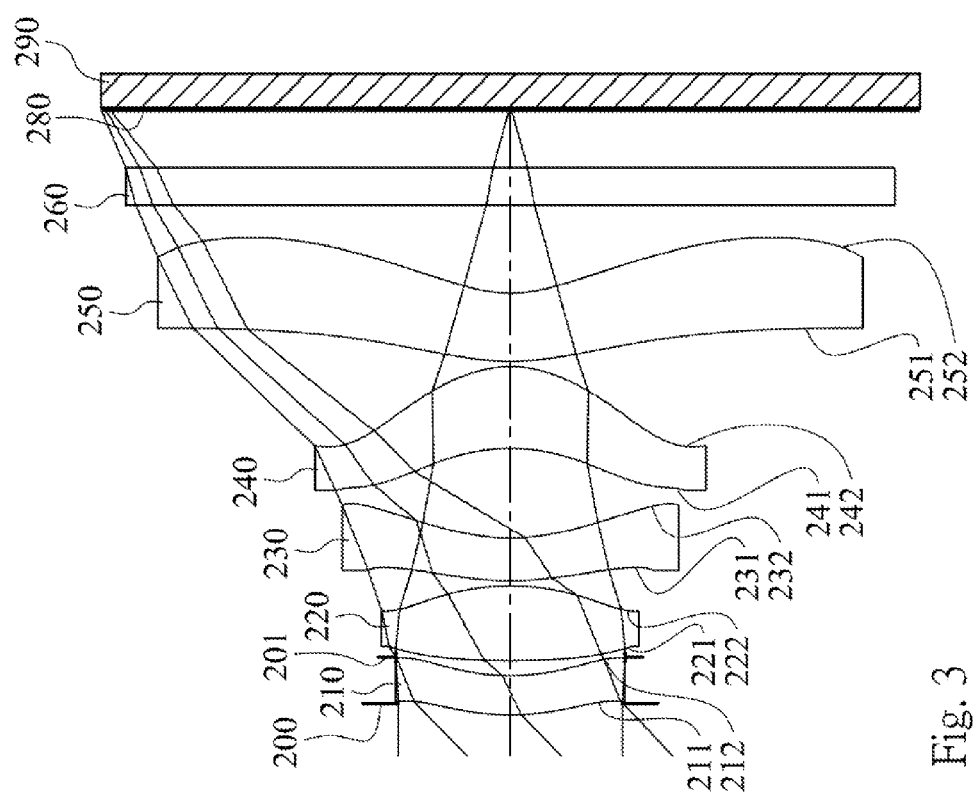
FIG. 3 is a schematic view of an image capturing device according to the 2nd embodiment of the present disclosure.
Figure 4:
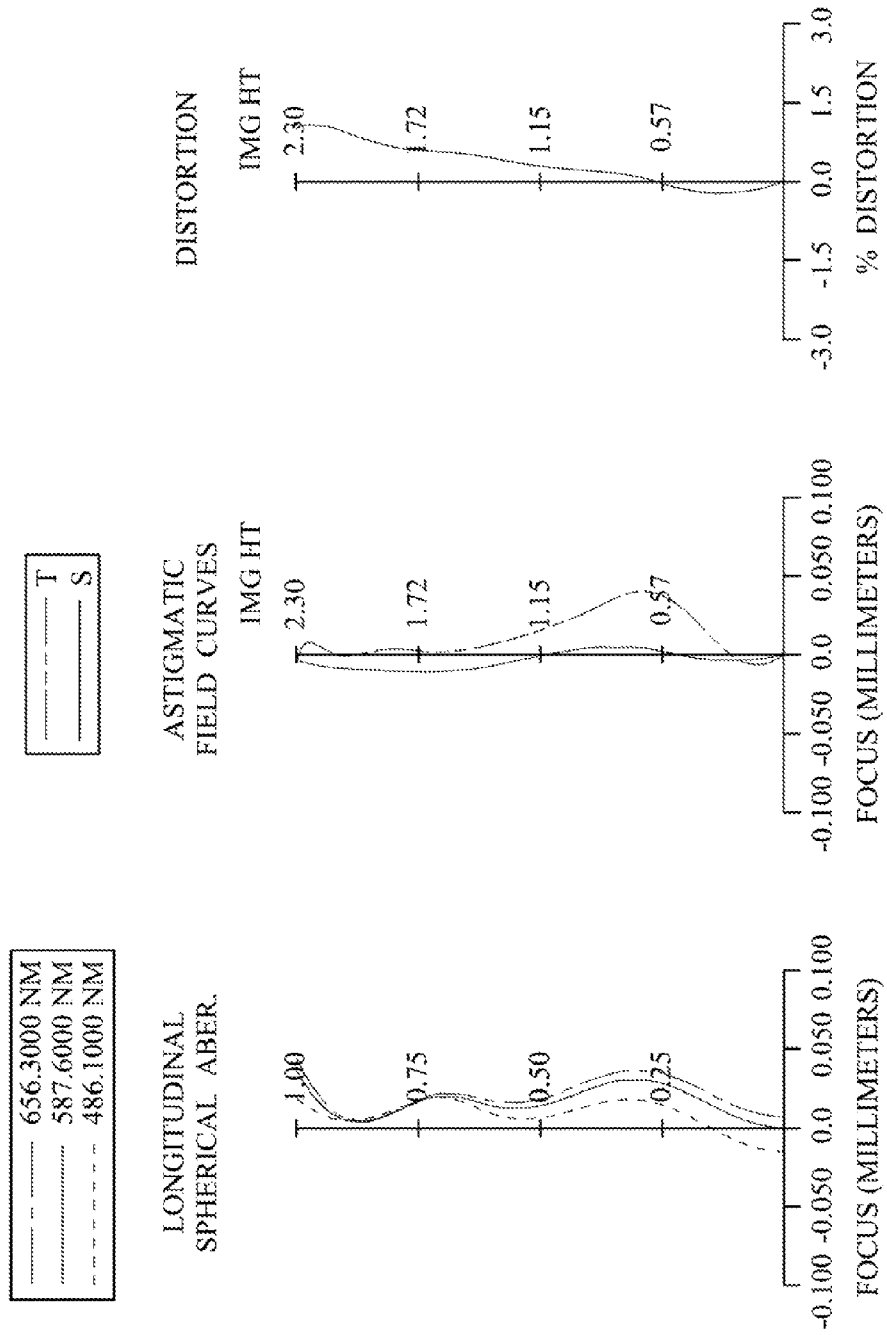
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment.

In FIG. 3, the image capturing device includes the optical image capturing system (not otherwise herein labeled) of the present disclosure and an image sensor 290. The optical image capturing system includes, in order from an object side to an image side, an aperture stop 200, a first lens element 210, a stop 201, a second lens element 220, a third lens element 230, a fourth lens element 240, a fifth lens element 250, an IR-cut filter 260 and an image plane 280, wherein the optical image capturing system has a total of five lens elements (210-250) with refractive power.

The first lens element 210 with negative refractive power has an object-side surface 211 being convex in a paraxial region thereof and an image-side surface 212 being concave in a paraxial region thereof, and is made of plastic material. The object-side surface 211 and the image-side surface 212 of the first lens element 210 are aspheric. Furthermore, both of the object-side surface 211 and the image-side surface 212 of the first lens element 210 have at least one inflection point.

The second lens element 220 with positive refractive power has an object-side surface 221 being convex in a paraxial region thereof and an image-side surface 222 being convex in a paraxial region thereof, and is made of plastic material. The object-side surface 221 and the image-side surface 222 of the second lens element 220 are aspheric. Furthermore, the image-side surface 222 of the second lens element 220 has at least one inflection point.

The third lens element 230 with negative refractive power has an object-side surface 231 being convex in a paraxial region thereof and an image-side surface 232 being concave in a paraxial region thereof, and is made of plastic material. The object-side surface 231 and the image-side surface 232 of the third lens element 230 are aspheric. Furthermore, both of the object-side surface 231 and the image-side surface 232 of the third lens element 230 have at least one inflection point.

The fourth lens element 240 with positive refractive power has an object-side surface 241 being concave in a paraxial region thereof and an image-side surface 242 being convex in a paraxial region thereof, and is made of plastic material. The object-side surface 241 and the image-side surface 242 of the fourth lens element 240 are aspheric. Furthermore, both of the object-side surface 241 and the image-side surface 242 of the fourth lens element 240 have at least one inflection point.

The fifth lens element 250 with negative refractive power has an object-side surface 251 being convex in a paraxial region thereof and an image-side surface 252 being concave in a paraxial region thereof, and is made of plastic material. The object-side surface 251 and the image-side surface 252 of the fifth lens element 250 are aspheric. Furthermore, both of the object-side surface 251 and the image-side surface 252 of the fifth lens element 250 have at least one inflection point.

The IR-cut filter 260 is made of glass and located between the fifth lens element 250 and the image plane 280, and will not affect the focal length of the optical image capturing system. The image sensor 290 is disposed on the image plane 280 of the optical image capturing system.

The detailed optical data of the 2nd embodiment are shown in Table 3 and the aspheric surface data are shown in Table 4 below.

TABLE 3

2nd Embodiment
f = 2.35 mm, Fno = 1.85, HFOV = 44.0 deg.

| Surface # | | Curvature Radius | | Thickness | Material | Index | Abbe # | Focal Length |
|---|---|---|---|---|---|---|---|---|
| 0 | | Plano | | Infinity | | | | |
| 1 | Ape. Stop | Plano | | −0.066 | | | | |
| 2 | Lens 1 | 1.355 | ASP | 0.220 | Plastic | 1.640 | 23.3 | −107.37 |
| 3 | | 1.245 | ASP | 0.107 | | | | |
| 4 | Stop | Plano | | −0.021 | | | | |
| 5 | Lens 2 | 5.525 | ASP | 0.426 | Plastic | 1.544 | 55.9 | 2.06 |
| 6 | | −1.367 | ASP | 0.030 | | | | |
| 7 | Lens 3 | 1.743 | ASP | 0.240 | Plastic | 1.640 | 23.3 | −6.29 |
| 8 | | 1.151 | ASP | 0.508 | | | | |
| 9 | Lens 4 | −1.039 | ASP | 0.467 | Plastic | 1.544 | 55.9 | 2.19 |
| 10 | | −0.643 | ASP | 0.030 | | | | |
| 11 | Lens 5 | 1.519 | ASP | 0.387 | Plastic | 1.640 | 23.3 | −2.71 |
| 12 | | 0.728 | ASP | 0.500 | | | | |
| 13 | IR-cut filter | Plano | | 0.210 | Glass | 1.517 | 64.2 | — |
| 14 | | Plano | | 0.334 | | | | |
| 15 | Image | Plano | | — | | | | |

Note:
Reference wavelength is 587.6 nm (d-line).
The effective radius of Surface 4 (stop) is 0.650 mm.

TABLE 4

Aspheric Coefficients

| Surface # | 2 | 3 | 5 | 6 | 7 |
|---|---|---|---|---|---|
| k = | −5.2204E+00 | −2.1701E+00 | −5.9227E+01 | −8.2015E+00 | −6.9287E+00 |
| A4 = | −1.6781E−02 | 9.9646E−03 | 2.0008E−01 | −2.3417E−01 | −2.0727E−01 |
| A6 = | −2.1924E−01 | −4.2942E−01 | 1.2686E−01 | −2.5890E+00 | 3.8683E−02 |
| A8 = | −2.8728E+00 | −1.6170E+00 | −8.4220E−01 | 2.7566E+01 | 2.6987E−01 |
| A10 = | 6.5278E+00 | 2.3954E+00 | 1.2144E+00 | −1.2839E+02 | −2.2462E+00 |
| A12 = | −5.8941E+00 | −1.6654E+00 | 1.3747E+00 | 3.1989E+02 | 5.9837E+00 |
| A14 = | | | −3.0894E+00 | −3.8998E+02 | −5.1797E+00 |
| A16 = | | | | 1.8214E+02 | |

| Surface # | 8 | 9 | 10 | 11 | 12 |
|---|---|---|---|---|---|
| k = | −1.2159E+00 | −2.6049E+00 | −1.4619E+00 | −2.4926E+00 | −5.7416E+00 |
| A4 = | −3.2675E−01 | 8.2421E−03 | 3.0612E−01 | −3.4755E−01 | −1.4344E−01 |
| A6 = | 4.7764E−01 | −3.0732E−01 | −1.0324E+00 | 3.7877E−01 | 1.1701E−01 |
| A8 = | −1.3460E+00 | 1.4376E+00 | 1.7225E+00 | −2.7077E−01 | −6.3879E−02 |
| A10 = | 2.5029E+00 | −4.0246E−01 | −9.9991E−01 | 1.2162E−01 | 2.0230E−02 |
| A12 = | −2.2353E+00 | −2.8297E+00 | 1.8866E−01 | −3.2421E−02 | −3.5023E−03 |
| A14 = | 6.7481E−01 | 3.6690E+00 | −1.6969E−02 | 4.6633E−03 | 2.8971E−04 |
| A16 = | | −1.4440E+00 | 9.5685E−03 | −2.7843E−04 | −8.1298E−06 |

In the optical image capturing system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

|  | 2nd Embodiment |  |  |
|---|---|---|---|
| f [mm] | 2.35 | (R3 + R4)/(R3 − R4) | 0.60 |
| Fno | 1.85 | (R5 + R6)/(R5 − R6) | 4.89 |
| HFOV [deg.] | 44.0 | f2/f4 | 0.94 |
| V2 − V3 | 32.6 | f2/f5 | −0.76 |
| V4/V5 | 2.40 | f/f4 + |f/f5| | 1.94 |
| T34/(T12 + T23 + T45) | 3.48 | FOV [deg.] | 88.0 |
| R1/R2 | 1.09 |  |  |

3rd Embodiment

Figure 5:
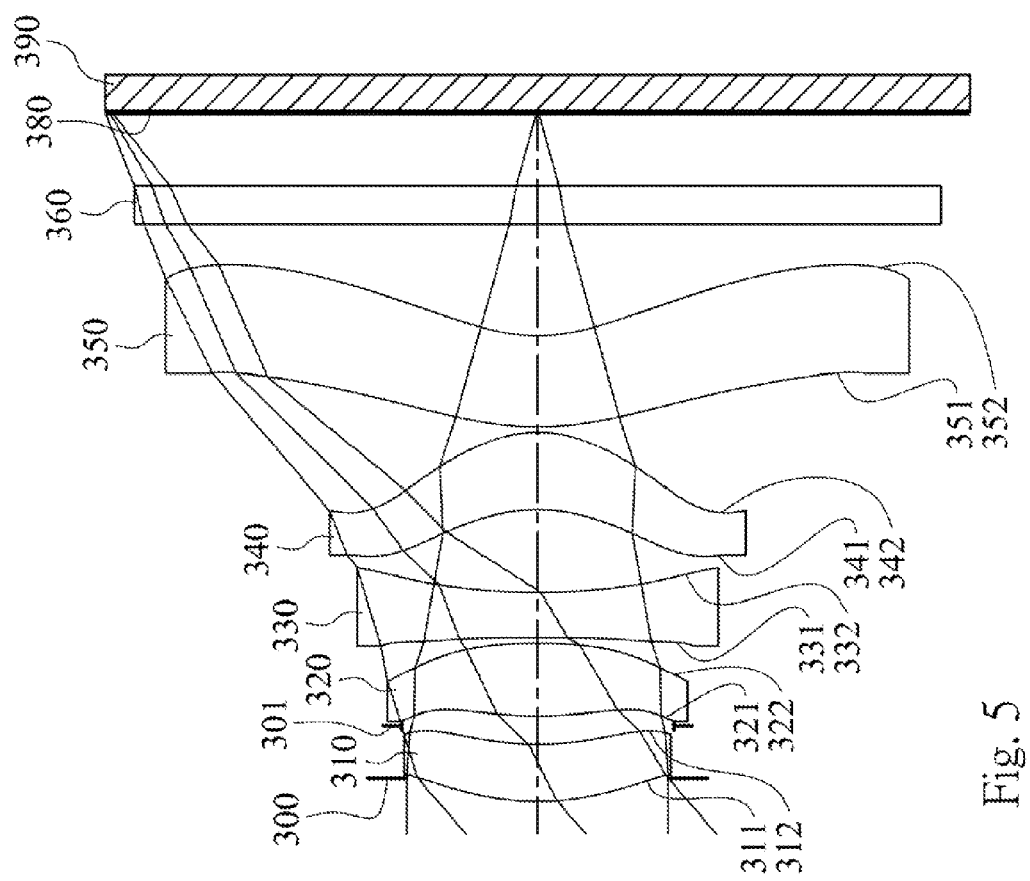
FIG. 5 is a schematic view of an image capturing device according to the 3rd embodiment of the present disclosure.
Figure 6:
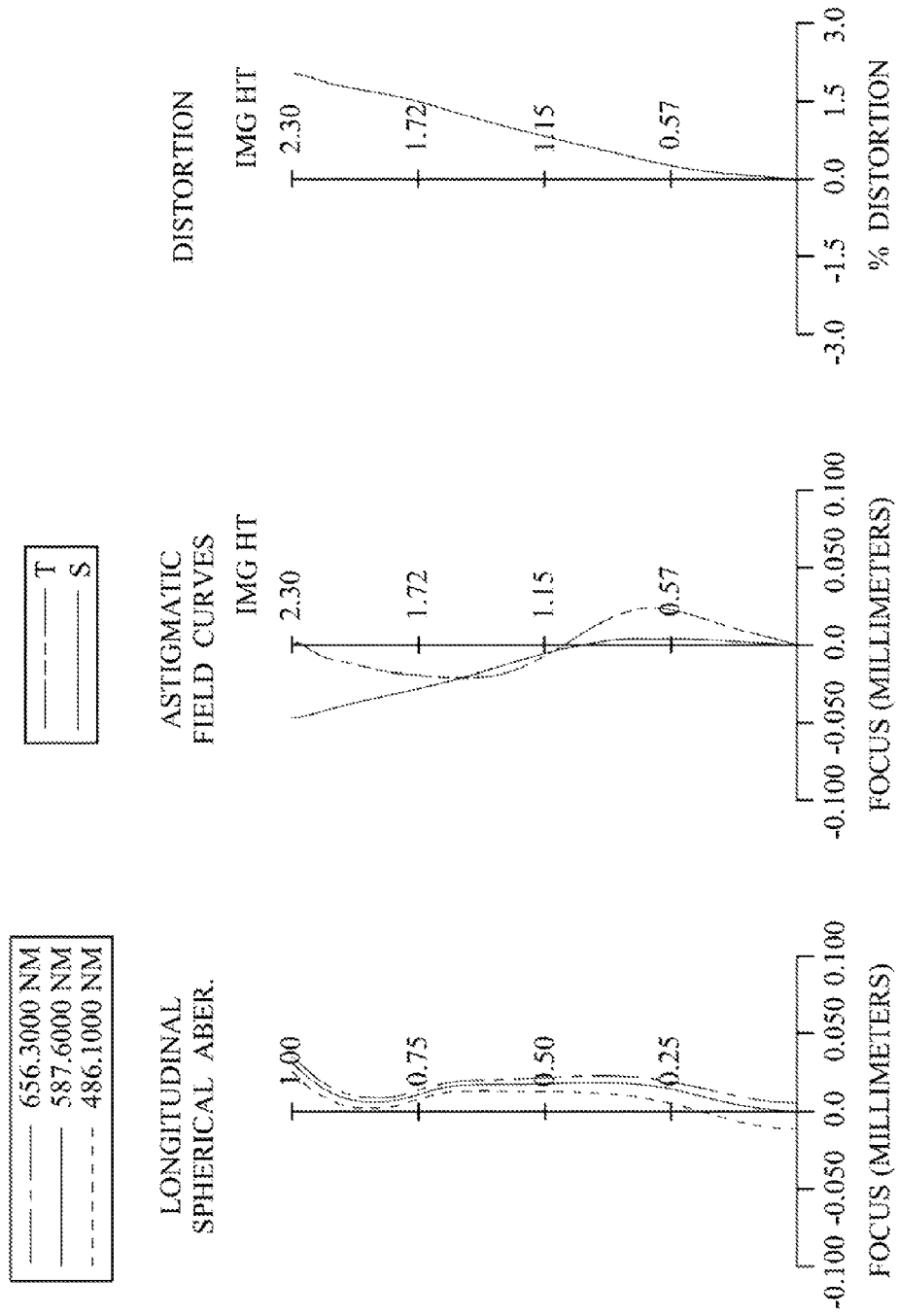
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment.

In FIG. 5, the image capturing device includes the optical image capturing system (not otherwise herein labeled) of the present disclosure and an image sensor 390. The optical image capturing system includes, in order from an object side to an image side, an aperture stop 300, a first lens element 310, a stop 301, a second lens element 320, a third lens element 330, a fourth lens element 340, a fifth lens element 350, an IR-cut filter 360 and an image plane 380, wherein the optical image capturing system has a total of five lens elements (310-350) with refractive power.

The first lens element 310 with positive refractive power has an object-side surface 311 being convex in a paraxial region thereof and an image-side surface 312 being concave in a paraxial region thereof, and is made of plastic material. The object-side surface 311 and the image-side surface 312 of the first lens element 310 are aspheric. Furthermore, both of the object-side surface 311 and the image-side surface 312 of the first lens element 310 have at least one inflection point.

The second lens element 320 with positive refractive power has an object-side surface 321 being convex in a paraxial region thereof and an image-side surface 322 being convex in a paraxial region thereof, and is made of plastic material. The object-side surface 321 and the image-side surface 322 of the second lens element 320 are aspheric. Furthermore, the object-side surface 321 of the second lens element 320 has at least one inflection point.

The third lens element 330 with negative refractive power has an object-side surface 331 being convex in a paraxial region thereof and an image-side surface 332 being concave in a paraxial region thereof, and is made of plastic material. The object-side surface 331 and the image-side surface 332 of the third lens element 330 are aspheric. Furthermore, both of the object-side surface 331 and the image-side surface 332 of the third lens element 330 have at least one inflection point.

The fourth lens element 340 with positive refractive power has an object-side surface 341 being concave in a paraxial region thereof and an image-side surface 342 being convex in a paraxial region thereof, and is made of plastic material. The object-side surface 341 and the image-side surface 342 of the fourth lens element 340 are aspheric. Furthermore, both of the object-side surface 341 and the image-side surface 342 of the fourth lens element 340 have at least one inflection point.

The fifth lens element 350 with negative refractive power has an object-side surface 351 being convex in a paraxial region thereof and an image-side surface 352 being concave in a paraxial region thereof, and is made of plastic material. The object-side surface 351 and the image-side surface 352 of the fifth lens element 350 are aspheric. Furthermore, both of the object-side surface 351 and the image-side surface 352 of the fifth lens element 350 have at least one inflection point.

The IR-cut filter 360 is made of glass and located between the fifth lens element 350 and the image plane 380, and will not affect the focal length of the optical image capturing system. The image sensor 390 is disposed on the image plane 380 of the optical image capturing system.

The detailed optical data of the 3rd embodiment are shown in Table 5 and the aspheric surface data are shown in Table 6 below.

TABLE 5

3rd Embodiment
f = 2.60 mm, Fno = 1.85, HFOV = 40.8 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.125 |  |  |  |  |
| 2 | Lens 1 | 1.409 | ASP | 0.307 | Plastic | 1.544 | 55.9 | 16.26 |
| 3 |  | 1.547 | ASP | 0.099 |  |  |  |  |
| 4 | Stop | Plano |  | 0.053 |  |  |  |  |
| 5 | Lens 2 | 2.303 | ASP | 0.391 | Plastic | 1.544 | 55.9 | 2.50 |
| 6 |  | −3.121 | ASP | 0.030 |  |  |  |  |
| 7 | Lens 3 | 71.564 | ASP | 0.240 | Plastic | 1.640 | 23.3 | −5.73 |
| 8 |  | 3.481 | ASP | 0.448 |  |  |  |  |
| 9 | Lens 4 | −0.917 | ASP | 0.415 | Plastic | 1.544 | 55.9 | 2.62 |
| 10 |  | −0.647 | ASP | 0.030 |  |  |  |  |
| 11 | Lens 5 | 1.595 | ASP | 0.486 | Plastic | 1.640 | 23.3 | −3.33 |
| 12 |  | 0.804 | ASP | 0.600 |  |  |  |  |
| 13 | IR-cut filter | Plano |  | 0.210 | Glass | 1.517 | 64.2 | — |
| 14 |  | Plano |  | 0.393 |  |  |  |  |
| 15 | Image | Plano |  | — |  |  |  |  |

Note:
Reference wavelength is 587.6 nm (d-line).
The effective radius of Surface 4 (stop) is 0730 mm.

TABLE 6

Aspheric Coefficients

| Surface # | 2 | 3 | 5 | 6 | 7 |
|---|---|---|---|---|---|
| k = | −1.1235E+00 | −2.4207E+00 | −2.0204E+01 | −1.9753E+00 | −9.0000E+01 |
| A4 = | −8.5771E−02 | −1.0086E−01 | 4.2237E−02 | −6.6407E−01 | −5.5061E−01 |
| A6 = | 4.6767E−01 | −4.5682E−01 | −1.4964E+00 | 2.4770E+00 | 2.9964E+00 |
| A8 = | −3.3350E+00 | −3.5654E−01 | 5.1314E+00 | −1.0492E+01 | −1.4150E+01 |
| A10 = | 9.9198E+00 | 9.2631E−01 | −2.2730E+01 | 2.3821E+01 | 4.4012E+01 |
| A12 = | −1.5158E+01 | −3.6486E+00 | 4.2844E+01 | −2.4151E+01 | −7.4358E+01 |
| A14 = | 8.5607E+00 | 4.8887E+00 | −2.5844E+01 | 8.6529E+00 | 6.3020E+01 |
| A16 = |  |  |  |  | −2.1663E+01 |

| Surface # | 8 | 9 | 10 | 11 | 12 |
|---|---|---|---|---|---|
| k = | −3.9513E+00 | −3.0436E+00 | −3.2603E+00 | −2.7409E+00 | −6.2379E+00 |
| A4 = | −1.1532E−02 | −1.7215E−01 | −5.0490E−01 | −1.4100E−01 | −3.5376E−02 |
| A6 = | 2.9057E−01 | 5.6625E−01 | 1.2531E+00 | 7.5197E−02 | −7.1139E−03 |
| A8 = | −1.2352E+00 | −1.2797E+00 | −2.5976E+00 | −1.9428E−02 | 1.5246E−02 |
| A10 = | 3.0958E+00 | 3.3975E+00 | 4.0860E+00 | −2.0613E−03 | −8.7384E−03 |
| A12 = | −4.1322E+00 | −4.2753E+00 | −3.3123E+00 | 2.9445E−03 | 2.4555E−03 |
| A14 = | 2.5990E+00 | 2.4476E+00 | 1.2640E+00 | −7.2627E−04 | −3.3709E−04 |
| A16 = | −6.0508E−01 | −5.4647E−01 | −1.8277E−01 | 5.4895E−05 | 1.6854E−05 |

In the optical image capturing system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 2.60 | (R3 + R4)/(R3 − R4) | −0.15 |
| Fno | 1.85 | (R5 + R6)/(R5 − R6) | 1.10 |
| HFOV [deg.] | 40.8 | f2/f4 | 0.95 |
| V2 − V3 | 32.6 | f2/f5 | −0.75 |
| V4/V5 | 2.40 | f/f4 + |f/f5| | 1.77 |
| T34/(T12 + T23 + T45) | 2.11 | FOV [deg.] | 81.6 |
| R1/R2 | 0.91 | | |

4th Embodiment

Figure 7:
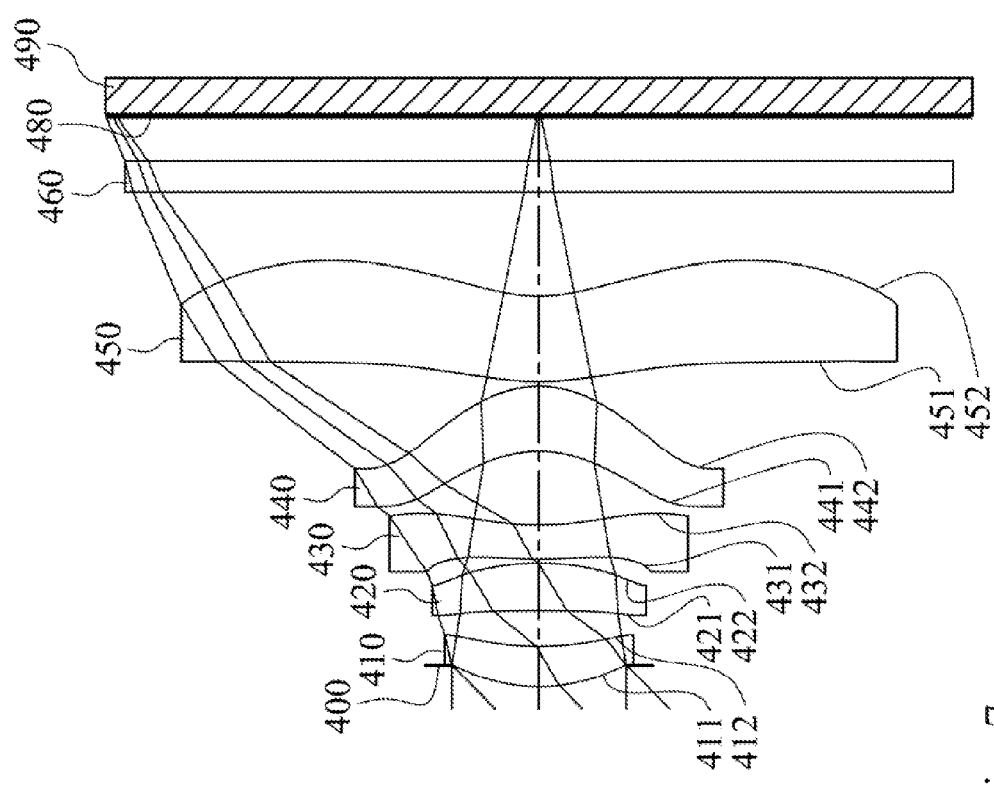
FIG. 7 is a schematic view of an image capturing device according to the 4th embodiment of the present disclosure.
Figure 8:
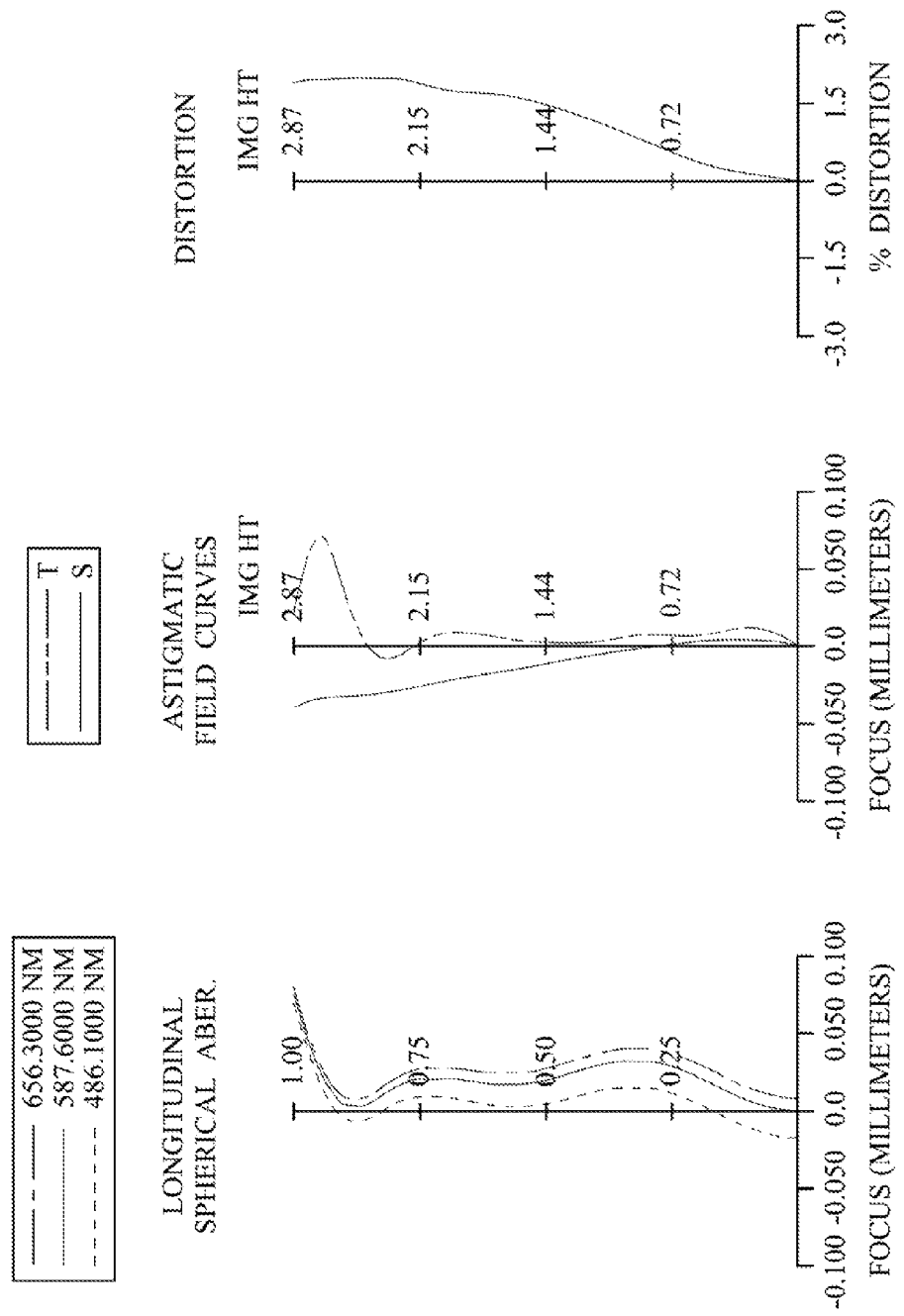
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment.

In FIG. 7, the image capturing device includes the optical image capturing system (not otherwise herein labeled) of the present disclosure and an image sensor 490. The optical image capturing system includes, in order from an object side to an image side, an aperture stop 400, a first lens element 410, a second lens element 420, a third lens element 430, a fourth lens element 440, a fifth lens element 450, an IR-cut filter 460 and an image plane 480, wherein the optical image capturing system has a total of five lens elements (410-450) with refractive power.

The first lens element 410 with positive refractive power has an object-side surface 411 being convex in a paraxial region thereof and an image-side surface 412 being concave in a paraxial region thereof, and is made of plastic material. The object-side surface 411 and the image-side surface 412 of the first lens element 410 are aspheric. Furthermore, both of the object-side surface 411 and the image-side surface 412 of the first lens element 410 have at least one inflection point.

The second lens element 420 with positive refractive power has an object-side surface 421 being concave in a paraxial region thereof and an image-side surface 422 being convex in a paraxial region thereof, and is made of plastic material. The object-side surface 421 and the image-side surface 422 of the second lens element 420 are aspheric. Furthermore, both of the object-side surface 421 and the image-side surface 422 of the second lens element 420 have at least one inflection point.

The third lens element 430 with negative refractive power has an object-side surface 431 being convex in a paraxial region thereof and an image-side surface 432 being concave in a paraxial region thereof, and is made of plastic material. The object-side surface 431 and the image-side surface 432 of the third lens element 430 are aspheric. Furthermore, both of the object-side surface 431 and the image-side surface 432 of the third lens element 430 have at least one inflection point.

The fourth lens element 440 with positive refractive power has an object-side surface 441 being concave in a paraxial region thereof and an image-side surface 442 being convex in a paraxial region thereof, and is made of plastic material. The object-side surface 441 and the image-side surface 442 of the fourth lens element 440 are aspheric. Furthermore, both of the object-side surface 441 and the image-side surface 442 of the fourth lens element 440 have at least one inflection point.

The fifth lens element 450 with negative refractive power has an object-side surface 451 being convex in a paraxial region thereof and an image-side surface 452 being concave in a paraxial region thereof, and is made of plastic material. The object-side surface 451 and the image-side surface 452 of the fifth lens element 450 are aspheric. Furthermore, both of the object-side surface 451 and the image-side surface 452 of the fifth lens element 450 have at least one inflection point.

The IR-cut filter 460 is made of glass and located between the fifth lens element 450 and the image plane 480, and will not affect the focal length of the optical image capturing system. The image sensor 490 is disposed on the image plane 480 of the optical image capturing system.

The detailed optical data of the 4th embodiment are shown in Table 7 and the aspheric surface data are shown in Table 8 below.

TABLE 7

4th Embodiment
f = 2.88 mm, Fno = 2.46, HFOV = 44.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.147 | | | | |
| 2 | Lens 1 | 1.164 | ASP | 0.274 | Plastic | 1.544 | 55.9 | 4.65 |
| 3 | | 1.978 | ASP | 0.240 | | | | |
| 4 | Lens 2 | −12.754 | ASP | 0.317 | Plastic | 1.544 | 55.9 | 3.90 |
| 5 | | −1.837 | ASP | 0.031 | | | | |
| 6 | Lens 3 | 4.263 | ASP | 0.230 | Plastic | 1.640 | 23.3 | −6.19 |
| 7 | | 2.010 | ASP | 0.492 | | | | |
| 8 | Lens 4 | −0.808 | ASP | 0.442 | Plastic | 1.544 | 55.9 | 4.01 |
| 9 | | −0.703 | ASP | 0.030 | | | | |
| 10 | Lens 5 | 1.892 | ASP | 0.576 | Plastic | 1.640 | 23.3 | −4.74 |
| 11 | | 1.026 | ASP | 0.700 | | | | |
| 12 | IR-cut filter | Plano | | 0.210 | Glass | 1.517 | 64.2 | — |
| 13 | | Plano | | 0.305 | | | | |
| 14 | Image | Plano | | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | −7.2132E−01 | −9.9337E−01 | −3.6925E+00 | −7.5049E+00 | −1.6514E+01 |
| A4 = | −1.2348E−02 | 8.1363E−02 | −9.9571E−02 | −1.8577E−01 | −1.6404E−01 |
| A6 = | 7.2674E−01 | −1.6267E+00 | 9.4187E−01 | 1.7433E−01 | −4.4543E−01 |
| A8 = | −5.0681E+00 | 1.2000E+01 | −1.3656E+01 | −6.1318E+01 | −3.8892E+00 |
| A10 = | 1.4368E+01 | −5.4253E+01 | 8.4672E+01 | 3.3792E+01 | 2.5424E+01 |
| A12 = | −1.6605E+01 | 1.1638E+02 | −2.8735E+02 | −7.7626E+01 | −6.5027E+01 |
| A14 = | 3.8910E−01 | −9.7972E+01 | 4.9925E+02 | 7.4266E+01 | 8.0159E+01 |
| A16 = | | | −3.3470E+02 | −1.3451E+01 | −4.2062E+01 |

| Surface # | 7 | 8 | 9 | 10 | 11 |
|---|---|---|---|---|---|
| k = | −7.1170E+00 | −4.1053E+00 | −1.7163E+00 | −2.5925E+01 | −8.2654E+00 |
| A4 = | −4.4855E−02 | −4.6473E−01 | −1.6428E−01 | −1.3699E−02 | −8.1678E−02 |
| A6 = | −1.9403E−01 | 7.9920E−01 | 3.4259E−01 | −3.7624E−02 | 4.6720E−02 |
| A8 = | −7.7999E−01 | −5.1797E−02 | −4.8812E−01 | 3.3676E−02 | −2.5102E−02 |
| A10 = | 3.9080E+00 | −1.6229E+00 | 5.3472E−01 | −1.2732E−02 | 9.0087E−03 |
| A12 = | −6.7400E+00 | 2.7231E+00 | −1.6593E−01 | 2.5396E−03 | −1.9123E−03 |
| A14 = | 5.2809E+00 | −1.8130E+00 | −5.9531E−02 | −2.5824E−04 | 2.1647E−04 |
| A16 = | −1.5639E+00 | 4.2913E−01 | 2.8786E−02 | 1.0299E−05 | −1.0081E−05 |

In the optical image capturing system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 2.88 | (R3 + R4)/(R3 − R4) | 1.34 |
| Fno | 2.46 | (R5 + R6)/(R5 − R6) | 2.78 |
| HFOV [deg.] | 44.3 | f2/f4 | 0.97 |
| V2 − V3 | 32.6 | f2/f5 | −0.82 |
| V4/V5 | 2.40 | f/f4 + |f/f5| | 1.33 |
| T34/(T12 + T23 + T45) | 1.63 | FOV [deg.] | 88.6 |
| R1/R2 | 0.59 | | |

5th Embodiment

Figure 9:
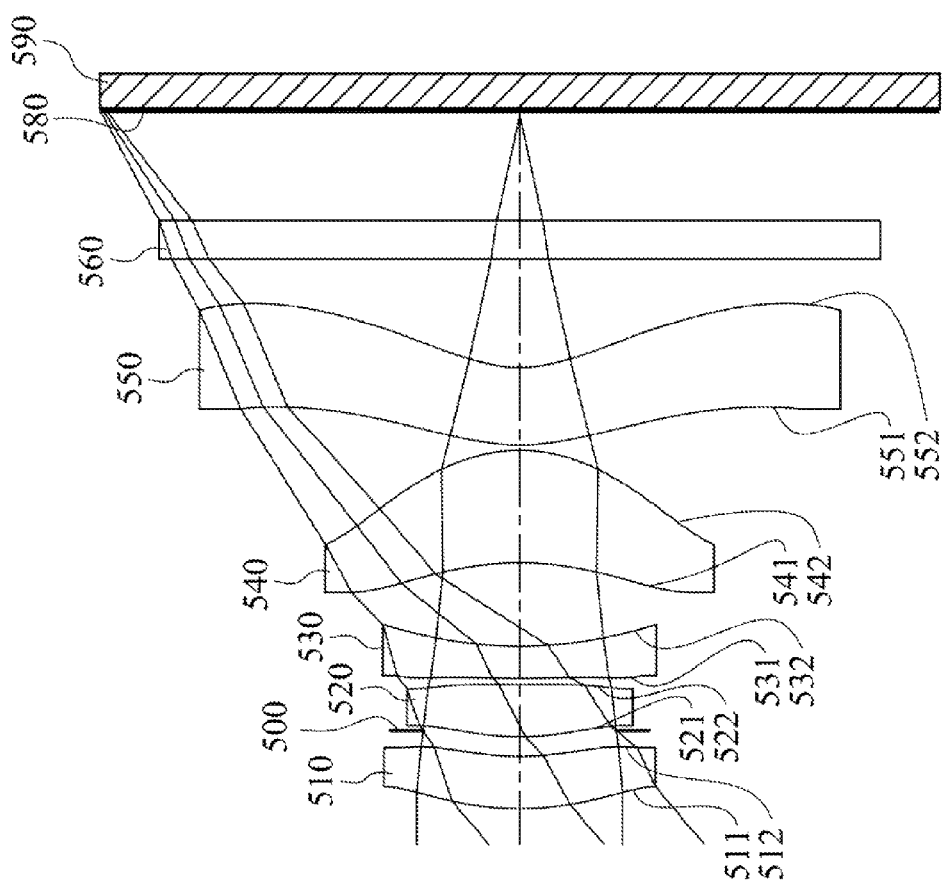
FIG. 9 is a schematic view of an image capturing device according to the 5th embodiment of the present disclosure.
Figure 10:
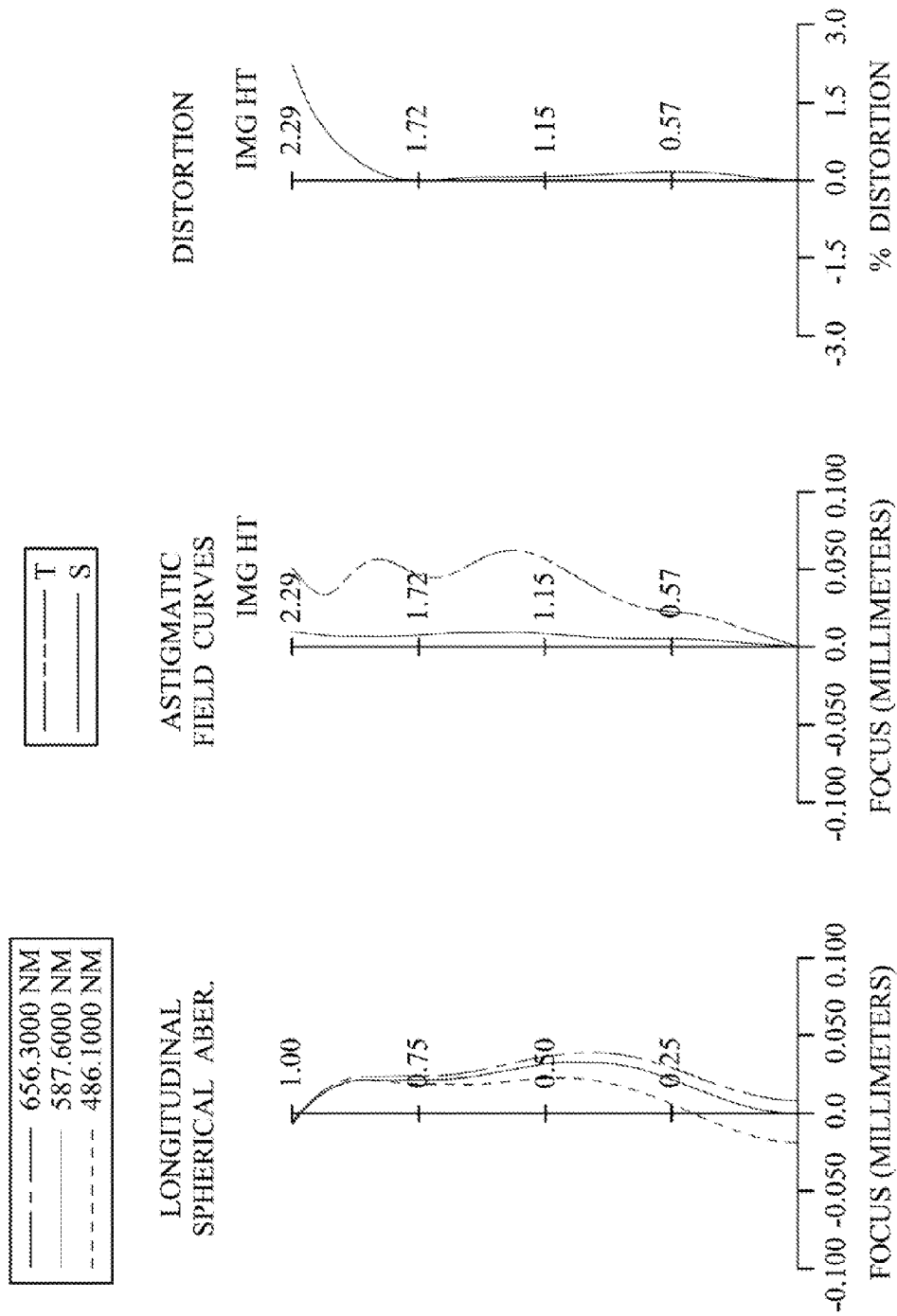
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment.

In FIG. 9, the image capturing device includes the optical image capturing system (not otherwise herein labeled) of the present disclosure and an image sensor 590. The optical image capturing system includes, in order from an object side to an image side, a first lens element 510, an aperture stop 500, a second lens element 520, a third lens element 530, a fourth lens element 540, a fifth lens element 550, an IR-cut filter 560 and an image plane 580, wherein the optical image capturing system has a total of five lens elements (510-550) with refractive power.

The first lens element 510 with positive refractive power has an object-side surface 511 being convex in a paraxial region thereof and an image-side surface 512 being concave in a paraxial region thereof, and is made of plastic material. The object-side surface 511 and the image-side surface 512 of the first lens element 510 are aspheric. Furthermore, both of the object-side surface 511 and the image-side surface 512 of the first lens element 510 have at least one inflection point.

The second lens element 520 with positive refractive power has an object-side surface 521 being convex in a paraxial region thereof and an image-side surface 522 being concave in a paraxial region thereof, and is made of plastic material. The object-side surface 521 and the image-side surface 522 of the second lens element 520 are aspheric. Furthermore, both of the object-side surface 521 and the image-side surface 522 of the second lens element 520 have at least one inflection point.

The third lens element 530 with negative refractive power has an object-side surface 531 being convex in a paraxial region thereof and an image-side surface 532 being concave in a paraxial region thereof, and is made of plastic material. The object-side surface 531 and the image-side surface 532 of the third lens element 530 are aspheric. Furthermore, the object-side surface 531 of the third lens element 530 has at least one inflection point.

The fourth lens element 540 with positive refractive power has an object-side surface 541 being concave in a paraxial region thereof and an image-side surface 542 being convex in a paraxial region thereof, and is made of plastic material. The object-side surface 541 and the image-side surface 542 of the fourth lens element 540 are aspheric. Furthermore, both of the object-side surface 541 and the image-side surface 542 of the fourth lens element 540 have at least one inflection point.

The fifth lens element 550 with negative refractive power has an object-side surface 551 being convex in a paraxial region thereof and an image-side surface 552 being concave in a paraxial region thereof, and is made of plastic material. The object-side surface 551 and the image-side surface 552 of the fifth lens element 550 are aspheric. Furthermore, both of the object-side surface 551 and the image-side surface 552 of the fifth lens element 550 have at least one inflection point.

The IR-cut filter 560 is made of glass and located between the fifth lens element 550 and the image plane 580, and will not affect the focal length of the optical image capturing system. The image sensor 590 is disposed on the image plane 580 of the optical image capturing system.

The detailed optical data of the 5th embodiment are shown in Table 9 and the aspheric surface data are shown in Table 10 below.

TABLE 9

5th Embodiment
f = 2.67 mm, Fno = 2.35, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.558 | ASP | 0.289 | Plastic | 1.544 | 55.9 | 96.03 |
| 2 | | 1.501 | ASP | 0.141 | | | | |
| 3 | Ape. Stop | Plano | | −0.033 | | | | |
| 4 | Lens 2 | 1.415 | ASP | 0.284 | Plastic | 1.544 | 55.9 | 2.91 |
| 5 | | 12.304 | ASP | 0.035 | | | | |
| 6 | Lens 3 | 4.815 | ASP | 0.180 | Plastic | 1.640 | 23.3 | −6.88 |
| 7 | | 2.266 | ASP | 0.458 | | | | |
| 8 | Lens 4 | −1.539 | ASP | 0.620 | Plastic | 1.544 | 55.9 | 2.72 |
| 9 | | −0.861 | ASP | 0.030 | | | | |
| 10 | Lens 5 | 1.201 | ASP | 0.428 | Plastic | 1.640 | 23.3 | −5.04 |
| 11 | | 0.753 | ASP | 0.600 | | | | |
| 12 | IR-cut filter | Plano | | 0.210 | Glass | 1.517 | 64.2 | — |
| 13 | | Plano | | 0.611 | | | | |
| 14 | Image | Plano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k = | −2.2571E+00 | −1.0908E+01 | −1.4002E+01 | −9.0000E+01 | −8.4572E+51 |
| A4 = | −1.1735E−01 | −1.6202E−01 | 1.3689E−01 | −7.3505E−01 | −6.3696E−01 |
| A6 = | 5.9636E−01 | −4.5166E−01 | −1.5962E+00 | 2.5579E+00 | 2.9796E+00 |
| A8 = | −3.4164E+00 | −8.3846E−02 | 4.4127E+00 | −1.0096E+01 | −1.3783E+01 |
| A10 = | 9.7901E+00 | 1.0809E+00 | −1.8967E+01 | 2.4770E+01 | 4.4564E+01 |
| A12 = | −1.5118E+01 | −3.6175E+00 | 4.2858E+01 | −2.2166E+01 | −7.4750E+01 |
| A14 = | 8.6661E+00 | 4.9796E+00 | −2.5842E+01 | 8.6819E+00 | 6.2982E+01 |
| A16 = | | | | | −2.1666E+01 |

| Surface # | 7 | 8 | 9 | 10 | 11 |
|---|---|---|---|---|---|
| k = | −5.7455E+00 | −3.7897E+00 | −2.9147E+00 | −3.4019E+00 | −3.7652E+00 |
| A4 = | 6.8861E−03 | 1.8502E−01 | −2.5841E−01 | −3.0202E−01 | −2.0830E−01 |
| A6 = | 2.8086E−01 | −7.5861E−01 | 1.9415E−01 | 3.4570E−01 | 2.1039E−01 |
| A8 = | −1.3322E+00 | 2.0142E+00 | 3.2312E−01 | −2.9575E−01 | −1.5816E−01 |
| A10 = | 3.0956E+00 | −3.0627E+00 | −1.4453E+00 | 1.7368E−01 | 7.7104E−02 |

TABLE 10-continued

| Aspheric Coefficients | | | | | |
|---|---|---|---|---|---|
| A12 = | −4.0226E+00 | 3.3619E+00 | 2.1811E+00 | −6.4310E−02 | −2.2910E−02 |
| A14 = | 2.6200E+00 | −2.3829E+00 | −1.4059E+00 | 1.3318E−02 | 3.7303E−03 |
| A16 = | −4.9761E−01 | 7.4522E−01 | 3.3097E−01 | −1.1764E−03 | −2.5388E−04 |

In the optical image capturing system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 2.67 | (R3 + R4)/(R3 − R4) | −1.26 |
| Fno | 2.35 | (R5 + R6)/(R5 − R6) | 2.78 |
| HFOV [deg.] | 39.9 | f2/f4 | 1.07 |
| V2 − V3 | 32.6 | f2/f5 | −0.58 |
| V4/V5 | 2.40 | f/f4 + |f/f5| | 1.51 |
| T34/(T12 + T23 + T45) | 2.65 | FOV [deg.] | 79.8 |
| R1/R2 | 1.04 | | |

6th Embodiment

Figure 11:
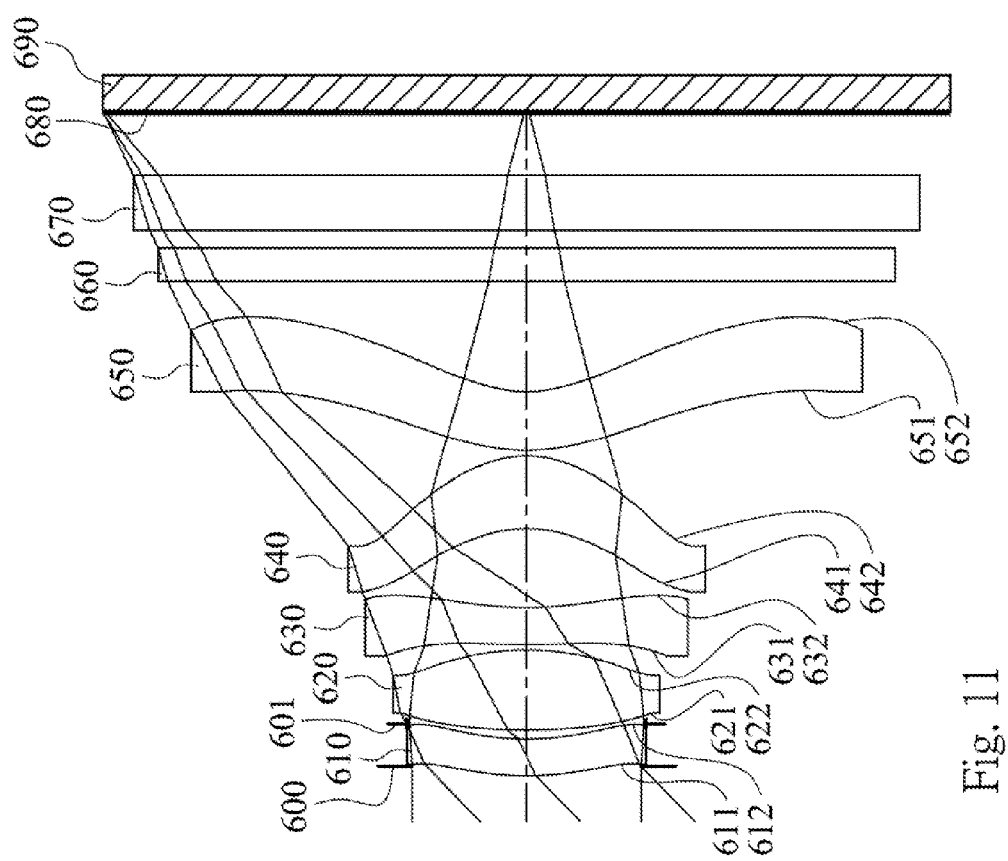
FIG. 11 is a schematic view of an image capturing device according to the 6th embodiment of the present disclosure.
Figure 12:
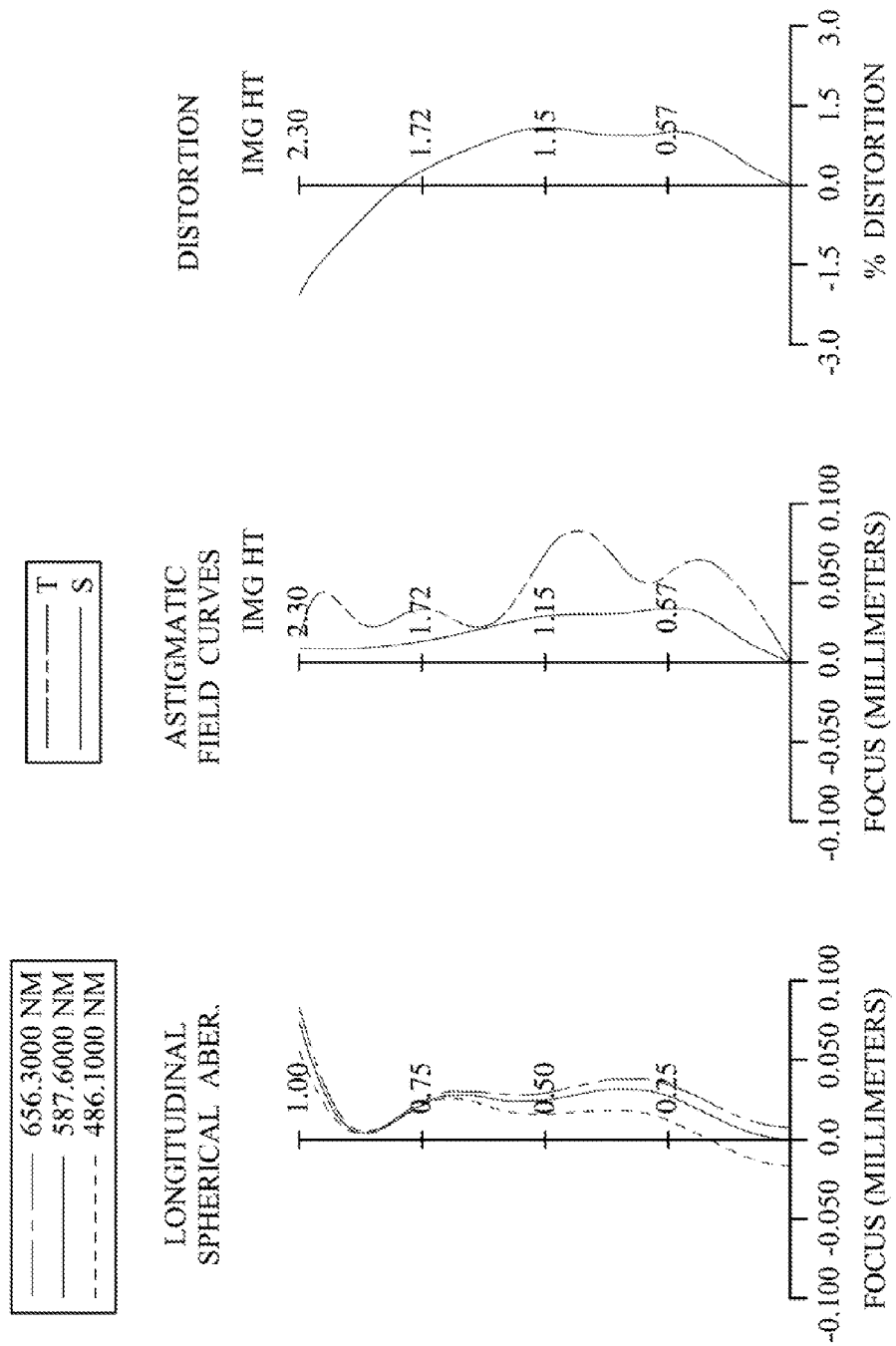
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment.

In FIG. 11, the image capturing device includes the optical image capturing system (not otherwise herein labeled) of the present disclosure and an image sensor 690. The optical image capturing system includes, in order from an object side to an image side, an aperture stop 600, a first lens element 610, a stop 601, a second lens element 620, a third lens element 630, a fourth lens element 640, a fifth lens element 650, an IR-cut filter 660, a cover glass 670, and an image plane 680, wherein the optical image capturing system has a total of five lens elements (610-650) with refractive power.

The first lens element 610 with positive refractive power has an object-side surface 611 being convex in a paraxial region thereof and an image-side surface 612 being concave in a paraxial region thereof, and is made of plastic material. The object-side surface 611 and the image-side surface 612 of the first lens element 610 are aspheric. Furthermore, both of the object-side surface 611 and the image-side surface 612 of the first lens element 610 have at least one inflection point.

The second lens element 620 with positive refractive power has an object-side surface 621 being convex in a paraxial region thereof and an image-side surface 622 being convex in a paraxial region thereof, and is made of plastic material. The object-side surface 621 and the image-side surface 622 of the second lens element 620 are aspheric. Furthermore, the image-side surface 622 of the second lens element 620 has at least one inflection point.

The third lens element 630 with negative refractive power has an object-side surface 631 being convex in a paraxial region thereof and an image-side surface 632 being concave in a paraxial region thereof, and is made of plastic material. The object-side surface 631 and the image-side surface 632 of the third lens element 630 are aspheric. Furthermore, both of the object-side surface 631 and the image-side surface 632 of the third lens element 630 have at least one inflection point.

The fourth lens element 640 with positive refractive power has an object-side surface 641 being concave in a paraxial region thereof and an image-side surface 642 being convex in a paraxial region thereof, and is made of plastic material. The object-side surface 641 and the image-side surface 642 of the fourth lens element 640 are aspheric. Furthermore, both of the object-side surface 641 and the image-side surface 642 of the fourth lens element 640 have at least one inflection point.

The fifth lens element 650 with negative refractive power has an object-side surface 651 being convex in a paraxial region thereof and an image-side surface 652 being concave in a paraxial region thereof, and is made of plastic material. The object-side surface 651 and the image-side surface 652 of the fifth lens element 650 are aspheric. Furthermore, both of the object-side surface 651 and the image-side surface 652 of the fifth lens element 650 have at least one inflection point.

The IR-cut filter 660 and a cover glass 670 are made of glass and located in order between the fifth lens element 650 and the image plane 680, and will not affect the focal length of the optical image capturing system. The image sensor 690 is disposed on the image plane 680 of the optical image capturing system.

The detailed optical data of the 6th embodiment are shown in Table 11 and the aspheric surface data are shown in Table 12 below.

TABLE 11

6th Embodiment
f = 2.42 mm, Fno = 1.95, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.053 | | | | |
| 2 | Lens 1 | 1.559 | ASP | 0.200 | Plastic | 1.640 | 23.3 | 249.16 |
| 3 | | 1.495 | ASP | 0.083 | | | | |
| 4 | Stop | Plano | | −0.033 | | | | |
| 5 | Lens 2 | 3.794 | ASP | 0.433 | Plastic | 1.544 | 55.9 | 2.00 |
| 6 | | −1.463 | ASP | 0.030 | | | | |
| 7 | Lens 3 | 5.362 | ASP | 0.200 | Plastic | 1.640 | 23.3 | −4.68 |

TABLE 11-continued

6th Embodiment
f = 2.42 mm, Fno = 1.95, HFOV = 43.9 deg.

| Surface # | | Curvature Radius | | Thickness | Material | Index | Abbe # | Focal Length |
|---|---|---|---|---|---|---|---|---|
| 8 | | 1.893 | ASP | 0.428 | | | | |
| 9 | Lens 4 | −0.729 | ASP | 0.393 | Plastic | 1.544 | 55.9 | 2.46 |
| 10 | | −0.562 | ASP | 0.030 | | | | |
| 11 | Lens 5 | 1.104 | ASP | 0.320 | Plastic | 1.535 | 55.7 | −3.88 |
| 12 | | 0.647 | ASP | 0.600 | | | | |
| 13 | IR-cut filter | Plano | | 0.175 | Glass | 1.517 | 64.2 | — |
| 14 | | Plano | | 0.100 | | | | |
| 15 | Cover-glass | Plano | | 0.300 | Glass | 1.517 | 64.2 | — |
| 16 | | Plano | | 0.340 | | | | |
| 17 | Image | Plano | | — | | | | |

Note:
Reference wavelength is 587.6 nm (d-line).
The effective radius of Surface 4 (stop) is 0.650 mm.

TABLE 12

Aspheric Coefficients

| Surface # | 2 | 3 | 5 | 6 | 7 |
|---|---|---|---|---|---|
| k = | −5.3289E+00 | −3.3442E+00 | −2.9999E+01 | −9.1933E+00 | −9.0000E+01 |
| A4 = | −4.5972E−02 | 5.3110E−03 | 2.0836E−01 | −2.5976E−01 | −3.2447E−01 |
| A6 = | −3.4983E−01 | −1.5468E−01 | 1.4862E−01 | −2.6637E+00 | −1.1343E−02 |
| A8 = | −1.7221E+00 | −2.1276E+00 | −1.2393E+00 | 2.7589E+01 | 2.2661E−01 |
| A10 = | 4.6191E+00 | 2.4009E+00 | 1.7322E+00 | −1.2814E+02 | −2.0146E+00 |
| A12 = | −5.8941E+00 | −1.6654E+00 | 1.3747E+00 | 3.1989E+02 | 5.9837E+00 |
| A14 = | | | −3.0894E+00 | −3.8998E+02 | −5.1797E+00 |
| A16 = | | | | 1.8214E+02 | 8.6229E−13 |

| Surface # | 8 | 9 | 10 | 11 | 12 |
|---|---|---|---|---|---|
| k = | −1.0714E+00 | −1.9346E+00 | −1.4307E+00 | −3.7746E+00 | −5.7414E+00 |
| A4 = | −3.2519E−01 | −7.2127E−02 | 7.0418E−01 | −2.2229E−02 | 6.9983E−02 |
| A6 = | 4.1363E−01 | 8.7045E−01 | −4.2522E+00 | −1.6723E−01 | −2.0863E−01 |
| A8 = | −1.3417E+00 | −7.2566E+00 | 1.5193E+01 | 2.2109E−01 | 1.8802E−01 |
| A10 = | 2.4838E+00 | 2.2342E+01 | −3.6595E+01 | −1.4211E−01 | −9.3610E−02 |
| A12 = | −2.2353E+00 | −2.7247E+01 | 5.2984E+01 | 5.1492E−02 | 2.6634E−02 |
| A14 = | 6.7481E−01 | 1.2704E+01 | −3.8969E+01 | −1.0018E−02 | −4.0353E−03 |
| A16 = | −7.6010E−12 | −1.1096E+00 | 1.1166E+01 | 8.0723E−04 | 2.4867E−04 |

In the optical image capturing system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 2.42 | (R3 + R4)/(R3 − R4) | 0.44 |
| Fno | 1.95 | (R5 + R6)/(R5 − R6) | 2.09 |
| HFOV [deg.] | 43.9 | f2/f4 | 0.81 |
| V2 − V3 | 32.6 | f2/f5 | −0.52 |
| V4/V5 | 1.00 | f/f4 + \|f/f5\| | 1.61 |
| T34/(T12 + T23 + T45) | 3.89 | FOV [deg.] | 87.8 |
| R1/R2 | 1.04 | | |

7th Embodiment

Figure 13:
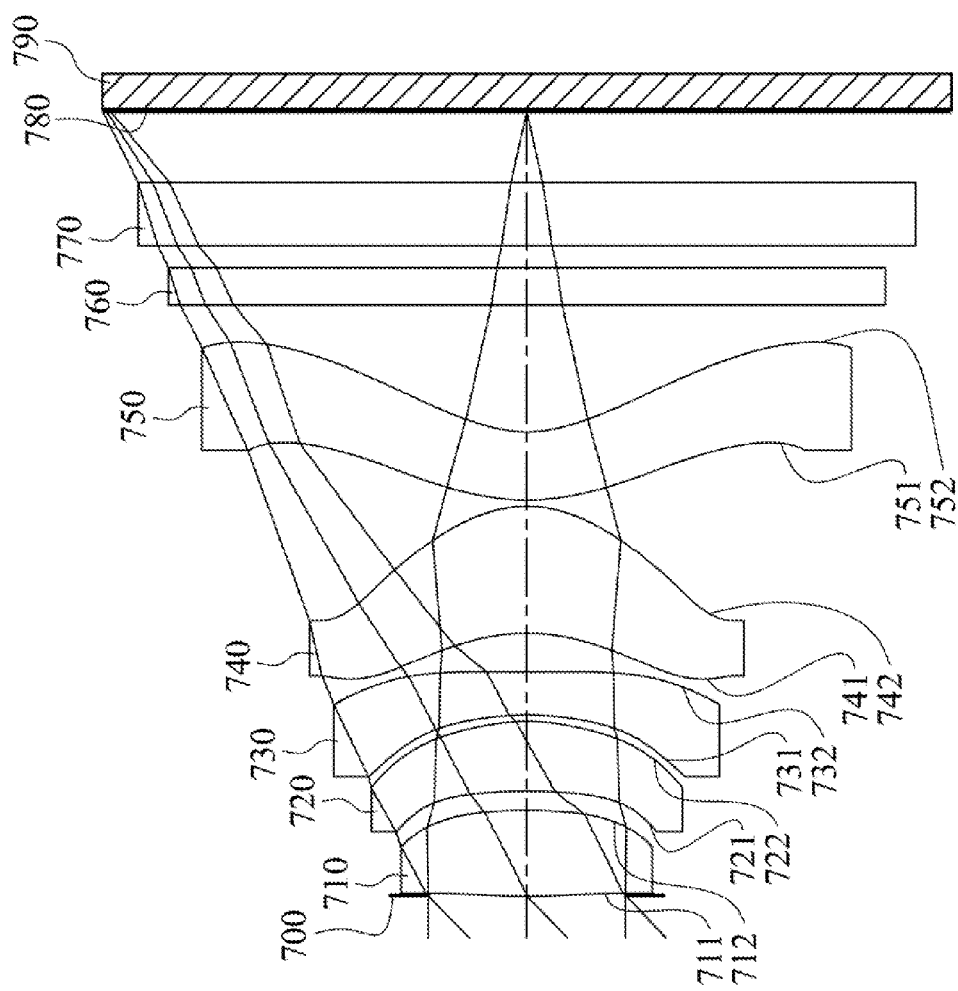
FIG. 13 is a schematic view of an image capturing device according to the 7th embodiment of the present disclosure.
Figure 14:
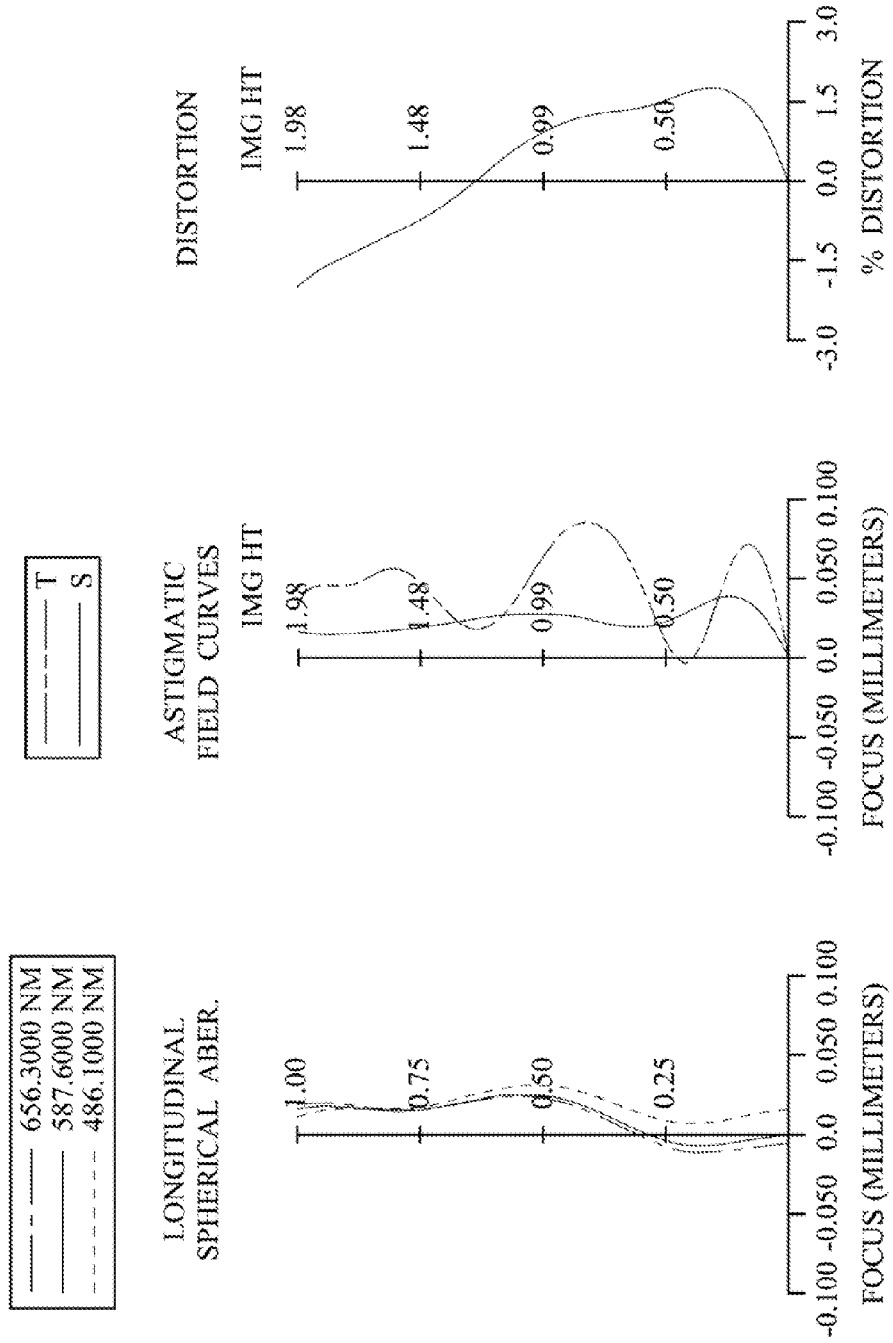
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment.

In FIG. 13, the image capturing device includes the optical image capturing system (not otherwise herein labeled) of the present disclosure and an image sensor 790. The optical image capturing system includes, in order from an object side to an image side, an aperture stop 700, a first lens element 710, a second lens element 720, a third lens element 730, a fourth lens element 740, a fifth lens element 750, an IR-cut filter 760, a cover glass 770 and an image plane 780, wherein the optical image capturing system has a total of five lens elements (710-750) with refractive power.

The first lens element 710 with positive refractive power has an object-side surface 711 being convex in a paraxial region thereof and an image-side surface 712 being convex in a paraxial region thereof, and is made of plastic material. The object-side surface 711 and the image-side surface 712 of the first lens element 710 are aspheric. Furthermore, the object-side surface 711 of the first lens element 710 has at least one inflection point.

The second lens element 720 with positive refractive power has an object-side surface 721 being concave in a paraxial region thereof and an image-side surface 722 being convex in a paraxial region thereof, and is made of plastic material. The object-side surface 721 and the image-side surface 722 of the second lens element 720 are aspheric.

The third lens element 730 with negative refractive power has an object-side surface 731 being concave in a paraxial region thereof and an image-side surface 732 being concave in a paraxial region thereof, and is made of plastic material. The object-side surface 731 and the image-side surface 732 of the third lens element 730 are aspheric.

The fourth lens element 740 with positive refractive power has an object-side surface 741 being concave in a paraxial region thereof and an image-side surface 742 being convex in a paraxial region thereof, and is made of plastic material. The object-side surface 741 and the image-side surface 742 of the fourth lens element 740 are aspheric. Furthermore, both of the object-side surface 741 and the image-side surface 742 of the fourth lens element 740 have at least one inflection point.

The fifth lens element 750 with negative refractive power has an object-side surface 751 being convex in a paraxial region thereof and an image-side surface 752 being concave in a paraxial region thereof, and is made of plastic material. The object-side surface 751 and the image-side surface 752 of the fifth lens element 750 are aspheric. Furthermore, both of the object-side surface 751 and the image-side surface 752 of the fifth lens element 750 have at least one inflection point.

The IR-cut filter 760 and a cover glass 770 are made of glass and located in order between the fifth lens element 750 and the image plane 780, and will not affect the focal length of the optical image capturing system. The image sensor 790 is disposed on the image plane 780 of the optical image capturing system.

The detailed optical data of the 7th embodiment are shown in Table 13 and the aspheric surface data are shown in Table 14 below.

TABLE 13

7th Embodiment
f = 2.09 mm, Fno = 2.25, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.002 | | | | |
| 2 | Lens 1 | 4.263 | ASP | 0.403 | Plastic | 1.535 | 55.7 | 2.97 |
| 3 | | −2.443 | ASP | 0.090 | | | | |
| 4 | Lens 2 | −2.905 | ASP | 0.330 | Plastic | 1.544 | 55.9 | 1.87 |
| 5 | | −0.783 | ASP | 0.030 | | | | |
| 6 | Lens 3 | −1.039 | ASP | 0.200 | Plastic | 1.640 | 23.3 | −1.54 |
| 7 | | 19.399 | ASP | 0.184 | | | | |
| 8 | Lens 4 | −0.989 | ASP | 0.598 | Plastic | 1.544 | 55.9 | 1.62 |
| 9 | | −0.566 | ASP | 0.030 | | | | |
| 10 | Lens 5 | 0.969 | ASP | 0.320 | Plastic | 1.640 | 23.3 | −2.93 |
| 11 | | 0.556 | ASP | 0.600 | | | | |
| 12 | IR-cut filter | Plano | | 0.175 | Glass | 1.517 | 64.2 | — |
| 13 | | Plano | | 0.100 | | | | |
| 14 | Cover-glass | Plano | | 0.300 | Glass | 1.517 | 64.2 | — |
| 15 | | Plano | | 0.339 | | | | |
| 16 | Image | Plano | | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | −1.9279E+01 | −1.5290E+00 | 1.0000E+00 | −1.9975E+01 | −5.3220E+01 |
| A4 = | −7.7783E−02 | −4.8219E−01 | −2.9345E−01 | −3.5167E−01 | −7.5073E−01 |
| A6 = | −1.0279E+00 | −8.2134E−01 | −8.0467E−01 | −3.2704E+00 | −2.6760E−01 |
| A8 = | 3.3431E+00 | −1.4642E+00 | −5.9450E+00 | 2.6889E+01 | 4.7539E−01 |
| A10 = | −9.2796E+00 | 2.7774E+00 | 1.0354E+01 | −1.2814E+02 | −1.2689E+00 |
| A12 = | −5.8941E+00 | −1.6654E+00 | 1.3747E+00 | 3.1989E+02 | 5.9837E+00 |
| A14 = | 3.3383E−11 | 2.1612E−11 | −3.0894E+00 | −3.8998E+02 | −5.1797E+00 |
| A16 = | 3.9887E−12 | 3.1665E−12 | −1.7388E−12 | 1.8214E+02 | 2.0127E−13 |

| Surface # | 7 | 8 | 9 | 10 | 11 |
|---|---|---|---|---|---|
| k = | −9.0000E+01 | −2.2436E+00 | −1.3580E+00 | −1.7989E+01 | −5.7414E+00 |
| A4 = | −3.5543E−01 | −5.8688E−01 | 8.2889E−02 | 6.1296E−01 | 2.8246E−01 |
| A6 = | 3.7727E−01 | 5.0585E+00 | 2.2661E−01 | −1.3601E+00 | −7.2813E−01 |
| A8 = | −1.3865E+00 | −1.9797E+01 | −9.4389E−01 | 1.4047E+00 | 8.0828E−01 |
| A10 = | 2.6887E+00 | 4.4535E+01 | −8.4399E−01 | −7.9088E−01 | −5.2239E−01 |
| A12 = | −2.2353E+00 | −5.4711E+01 | 5.4078E+00 | 2.0313E−01 | 1.9872E−01 |
| A14 = | 6.7481E−01 | 3.4631E+01 | −5.3097E+00 | 1.6846E−04 | −4.1246E−02 |
| A16 = | −3.1189E−12 | −8.9304E+00 | 1.5615E+00 | −7.6132E−03 | 3.5808E−03 |

In the optical image capturing system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f [mm] | 2.09 | (R3 + R4)/(R3 − R4) | 1.74 |
| Fno | 2.25 | (R5 + R6)/(R5 − R6) | −0.90 |
| HFOV [deg.] | 43.9 | f2/f4 | 1.15 |
| V2 − V3 | 32.6 | f2/f5 | −0.64 |
| V4/V5 | 2.40 | f/f4 + |f/f5| | 2.00 |
| T34/(T12 + T23 + T45) | 1.23 | FOV [deg.] | 87.8 |
| R1/R2 | −1.75 | | |

8th Embodiment

Figure 15:
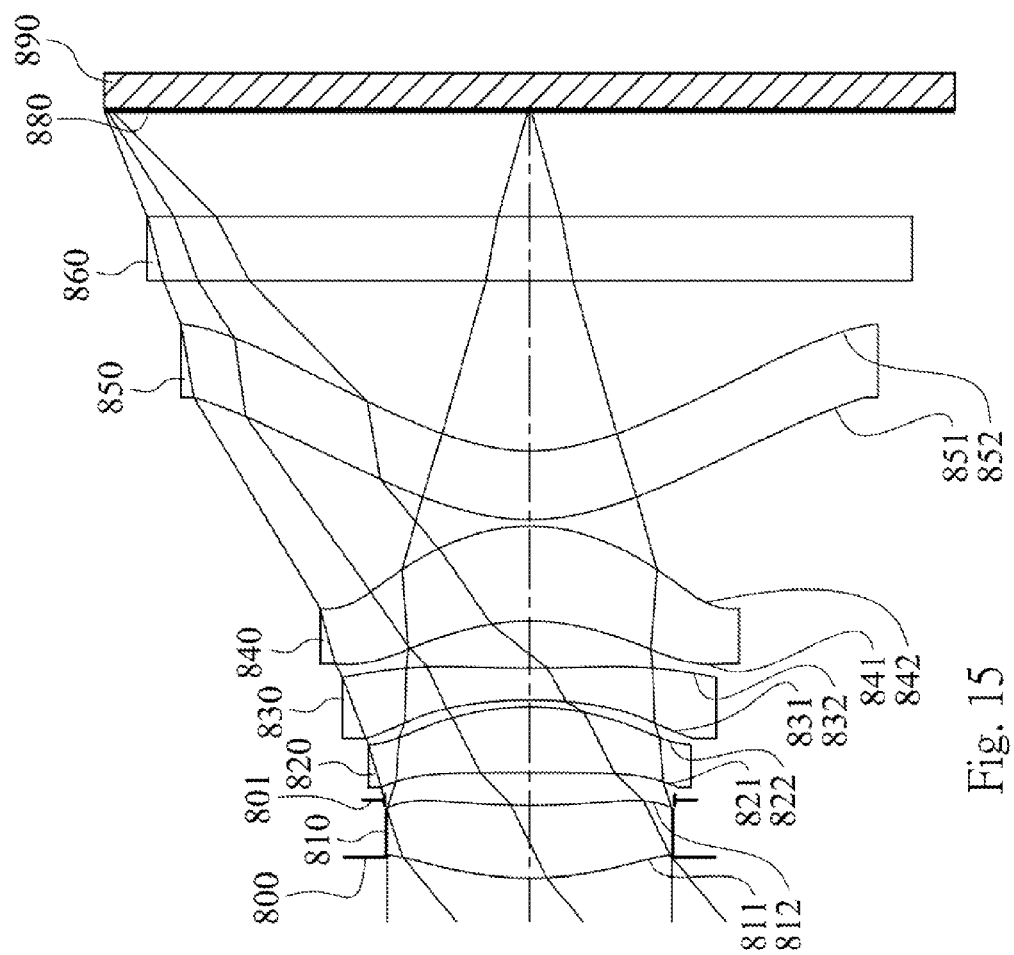
FIG. 15 is a schematic view of an image capturing device according to the 8th embodiment of the present disclosure.
Figure 16:
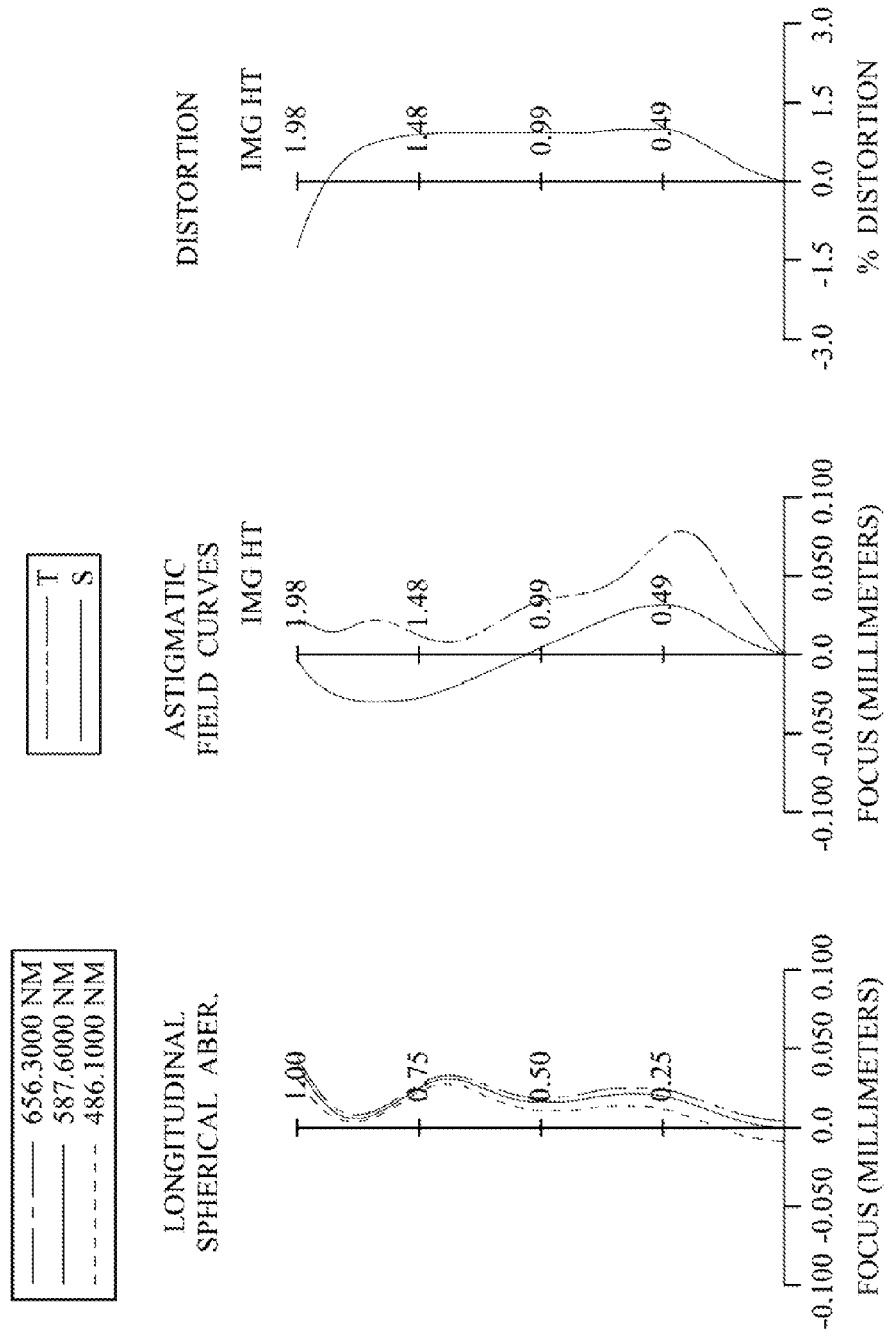
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment.

In FIG. 15, the image capturing device includes the optical image capturing system (not otherwise herein labeled) of the present disclosure and an image sensor 890. The optical image capturing system includes, in order from an object side to an image side, an aperture stop 800, a first lens element 810, a stop 801, a second lens element 820, a third lens element 830, a fourth lens element 840, a fifth lens element 850, an IR-cut filter 860 and an image plane 880, wherein the optical image capturing system has a total of five lens elements (810-850) with refractive power.

The first lens element 810 with positive refractive power has an object-side surface 811 being convex in a paraxial region thereof and an image-side surface 812 being concave in a paraxial region thereof, and is made of plastic material. The object-side surface 811 and the image-side surface 812 of the first lens element 810 are aspheric. Furthermore, both of the object-side surface 811 and the image-side surface 812 of the first lens element 810 have at least one inflection point.

The second lens element 820 with positive refractive power has an object-side surface 821 being concave in a paraxial region thereof and an image-side surface 822 being convex in a paraxial region thereof, and is made of plastic material. The object-side surface 821 and the image-side surface 822 of the second lens element 820 are aspheric. Furthermore, the image-side surface 822 of the second lens element 820 has at least one inflection point.

The third lens element 830 with negative refractive power has an object-side surface 831 being concave in a paraxial region thereof and an image-side surface 832 being concave in a paraxial region thereof, and is made of plastic material. The object-side surface 831 and the image-side surface 832 of the third lens element 830 are aspheric. Furthermore, both of the object-side surface 831 and the image-side surface 832 of the third lens element 830 have at least one inflection point.

The fourth lens element 840 with positive refractive power has an object-side surface 841 being concave in a paraxial region thereof and an image-side surface 842 being convex in a paraxial region thereof, and is made of plastic material. The object-side surface 841 and the image-side surface 842 of the fourth lens element 840 are aspheric. Furthermore, both of the object-side surface 841 and the image-side surface 842 of the fourth lens element 840 have at least one inflection point.

The fifth lens element 850 with negative refractive power has an object-side surface 851 being convex in a paraxial region thereof and an image-side surface 852 being concave in a paraxial region thereof, and is made of plastic material. The object-side surface 851 and the image-side surface 852 of the fifth lens element 850 are aspheric. Furthermore, both of the object-side surface 851 and the image-side surface 852 of the fifth lens element 850 have at least one inflection point.

The IR-cut filter 860 is made of glass and located between the fifth lens element 850 and the image plane 880, and will not affect the focal length of the optical image capturing system. The image sensor 890 is disposed on the image plane 880 of the optical image capturing system.

The detailed optical data of the 8th embodiment are shown in Table 15 and the aspheric surface data are shown in Table 16 below.

TABLE 15

8th Embodiment
f = 2.38 mm, Fno = 1.78, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.096 | | | | |
| 2 | Lens 1 | 1.626 | ASP | 0.342 | Plastic | 1.544 | 55.9 | 5.27 |
| 3 | | 3.475 | ASP | 0.025 | | | | |
| 4 | Stop | Plano | | 0.127 | | | | |
| 5 | Lens 2 | −62.637 | ASP | 0.309 | Plastic | 1.535 | 55.7 | 2.40 |
| 6 | | −1.261 | ASP | 0.030 | | | | |
| 7 | Lens 3 | −2.563 | ASP | 0.150 | Plastic | 1.634 | 23.8 | −2.72 |
| 8 | | 5.414 | ASP | 0.223 | | | | |
| 9 | Lens 4 | −1.036 | ASP | 0.445 | Plastic | 1.544 | 55.9 | 4.19 |
| 10 | | −0.820 | ASP | 0.030 | | | | |
| 11 | Lens 5 | 1.021 | ASP | 0.320 | Plastic | 1.634 | 23.8 | −80.05 |
| 12 | | 0.879 | ASP | 0.800 | | | | |
| 13 | IR-cut filter | Plano | | 0.300 | Glass | 1.517 | 64.2 | — |
| 14 | | Plano | | 0.499 | | | | |
| 15 | Image | Plano | | — | | | | |

Note:
Reference wavelength is 587.6 nm (d-line).
The effective radius of Surface 4 (stop) is 0.680 mm.

TABLE 16

| Aspheric Coefficients | | | | | |
|---|---|---|---|---|---|
| Surface # | 2 | 3 | 5 | 6 | 7 |
| k = | −1.9519E+00 | −8.0711E−01 | 1.0000E+00 | −7.3958E+00 | −9.9657E+00 |
| A4 = | 1.1640E−02 | −1.1483E−01 | −4.1820E−02 | −1.6302E−01 | −4.5092E−01 |
| A6 = | 5.9990E−03 | 4.4619E−02 | −1.8498E−01 | −2.7721E+00 | 2.1458E−02 |
| A8 = | −1.5214E+00 | −2.6798E+00 | −2.3120E+00 | 2.6684E+01 | 7.4189E−01 |
| A10 = | 4.4143E+00 | 3.3975E+00 | 3.5831E+00 | −1.2703E+02 | −1.9508E+00 |
| A12 = | −5.8941E+00 | −1.6654E+00 | 1.3747E+00 | 3.1989E+02 | 5.9837E+00 |
| A14 = | | | −3.0894E+00 | −3.8998E+02 | −5.1797E+00 |
| A16 = | | | | 1.8214E+02 | 6.5030E−11 |
| Surface # | 8 | 9 | 10 | 11 | 12 |
| k = | −9.0000E+01 | −1.8784E+00 | −1.2440E+00 | −1.8749E+00 | −4.3028E+00 |
| A4 = | −3.0674E−01 | 2.4318E−01 | 1.9637E−01 | −2.1854E−01 | 2.5919E−02 |
| A6 = | 4.6677E−01 | −3.8301E−01 | −1.4671E+00 | 2.9421E−01 | −1.0328E−02 |
| A8 = | −1.2922E+00 | −1.6006E+00 | 5.9954E+00 | −2.8720E−01 | −2.6851E−02 |
| A10 = | 2.5293E+00 | 8.0573E+00 | −1.4937E+01 | 1.8283E−01 | 3.1572E−02 |
| A12 = | −2.3660E+00 | −1.0340E+01 | 2.1955E+01 | −7.0998E−02 | −1.5526E−02 |
| A14 = | 8.5381E−01 | 4.3871E+00 | −1.6156E+01 | 1.4995E−02 | 3.5854E−03 |
| A16 = | −9.4548E−11 | −1.1127E−01 | 4.5946E+00 | −1.3087E−03 | −3.1915E−04 |

In the optical image capturing system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 2.38 | (R3 + R4)/(R3 − R4) | 1.04 |
| Fno | 1.78 | (R5 + R6)/(R5 − R6) | −0.36 |
| HFOV [deg.] | 40.0 | f2/f4 | 0.57 |
| V2 − V3 | 31.9 | f2/f5 | −0.03 |
| V4/V5 | 2.35 | f/f4 + \|f/f5\| | 0.60 |
| T34/(T12 + T23 + T45) | 1.05 | FOV [deg.] | 80.0 |
| R1/R2 | 0.47 | | |

9th Embodiment

Figure 17:
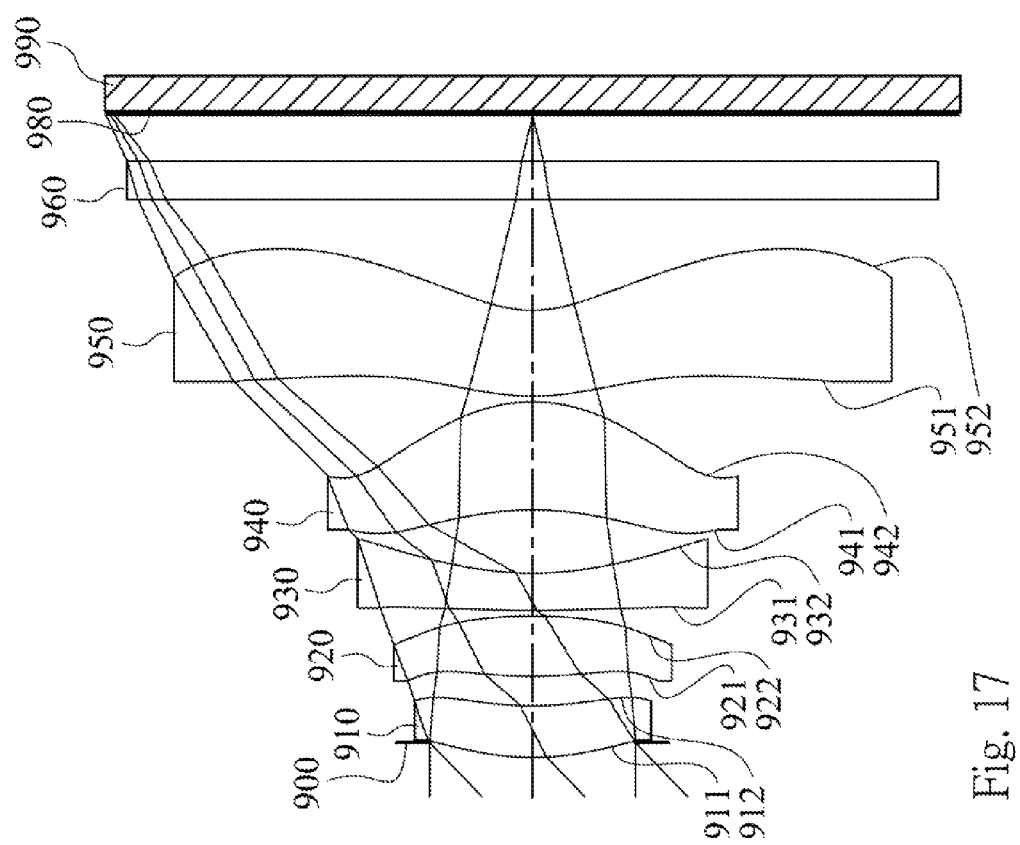
FIG. 17 is a schematic view of an image capturing device according to the 9th embodiment of the present disclosure.
Figure 18:
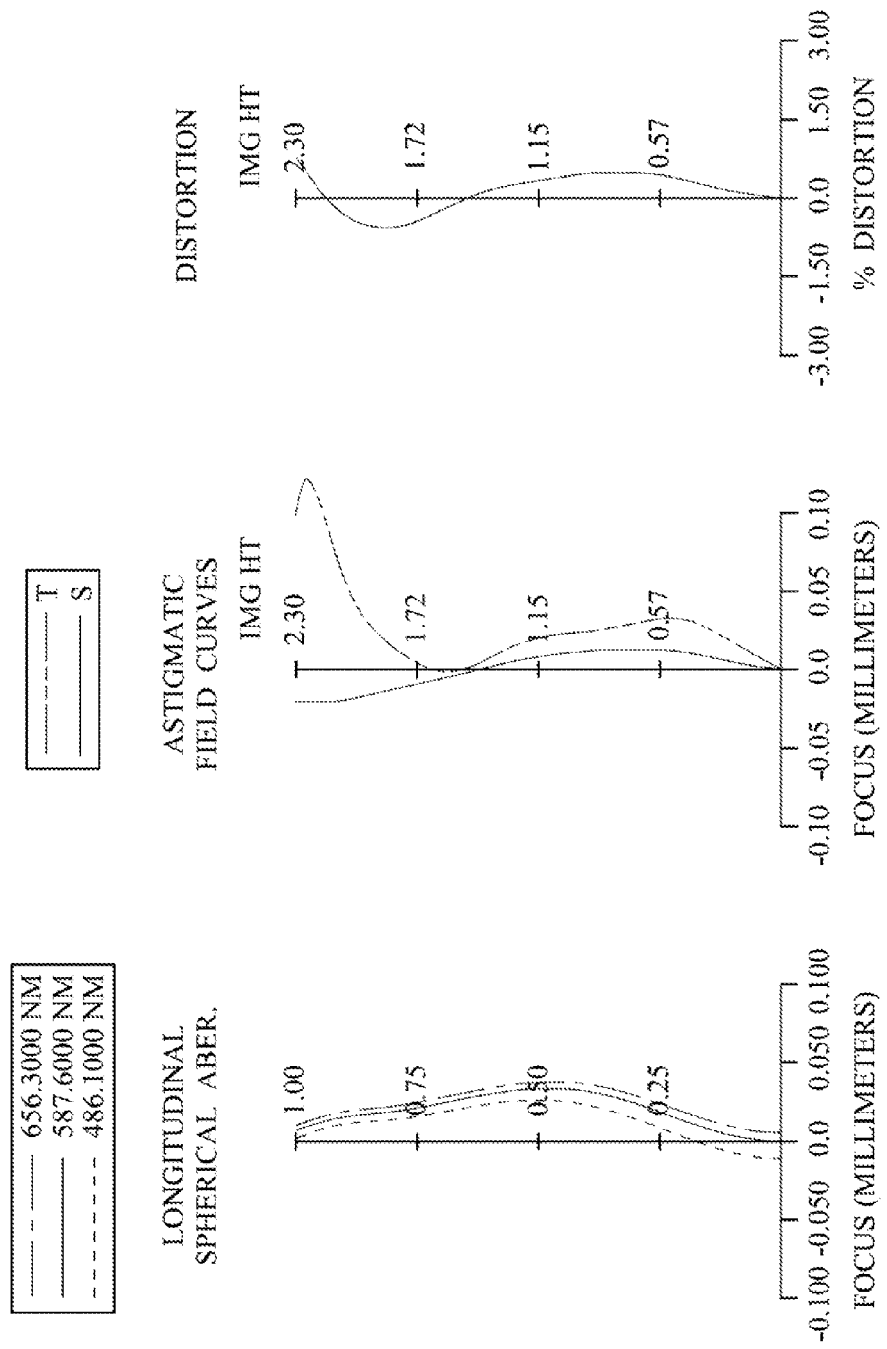
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows, in order from left to right, spherical aberration curves, astigmatic field curves and a distortion curve of the image capturing device according to the 9th embodiment.

In FIG. 17, the image capturing device includes the optical image capturing system (not otherwise herein labeled) of the present disclosure and an image sensor 990. The optical image capturing system includes, in order from an object side to an image side, an aperture stop 900, a first lens element 910, a second lens element 920, a third lens element 930, a fourth lens element 940, a fifth lens element 950, an IR-cut filter 960 and an image plane 980, wherein the optical image capturing system has a total of five lens elements (910-950) with refractive power.

The first lens element 910 with positive refractive power has an object-side surface 911 being convex in a paraxial region thereof and an image-side surface 912 being concave in a paraxial region thereof, and is made of glass material. The object-side surface 911 and the image-side surface 912 of the first lens element 910 are aspheric. Furthermore, both of the object-side surface 911 and the image-side surface 912 of the first lens element 910 have at least one inflection point.

The second lens element 920 with positive refractive power has an object-side surface 921 being convex in a paraxial region thereof and an image-side surface 922 being convex in a paraxial region thereof, and is made of plastic material. The object-side surface 921 and the image-side surface 922 of the second lens element 920 are aspheric. Furthermore, the object-side surface 921 of the second lens element 920 has at least one inflection point.

The third lens element 930 with negative refractive power has an object-side surface 931 being convex in a paraxial region thereof and an image-side surface 932 being concave in a paraxial region thereof, and is made of plastic material. The object-side surface 931 and the image-side surface 932 of the third lens element 930 are aspheric. Furthermore, both of the object-side surface 931 and the image-side surface 932 of the third lens element 930 have at least one inflection point.

The fourth lens element 940 with positive refractive power has an object-side surface 941 being concave in a paraxial region thereof and an image-side surface 942 being convex in a paraxial region thereof, and is made of plastic material. The object-side surface 941 and the image-side surface 942 of the fourth lens element 940 are aspheric. Furthermore, both of the object-side surface 941 and the image-side surface 942 of the fourth lens element 940 have at least one inflection point.

The fifth lens element 950 with negative refractive power has an object-side surface 951 being convex in a paraxial region thereof and an image-side surface 952 being concave in a paraxial region thereof, and is made of plastic material. The object-side surface 951 and the image-side surface 952 of the fifth lens element 950 are aspheric. Furthermore, both of the object-side surface 951 and the image-side surface 952 of the fifth lens element 950 have at least one inflection point.

The IR-cut filter 960 is made of glass and located between the fifth lens element 950 and the image plane 980, and will not affect the focal length of the optical image capturing system. The image sensor 990 is disposed on the image plane 980 of the optical image capturing system.

The detailed optical data of the 9th embodiment are shown in Table 17 and the aspheric surface data are shown in Table 18 below.

TABLE 17

9th Embodiment
f = 2.40 mm, Fno = 2.15, HFOV = 43.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.082 | | | | |
| 2 | Lens 1 | 1.489 | ASP | 0.277 | Glass | 1.566 | 61.1 | 10.73 |
| 3 | | 1.840 | ASP | 0.161 | | | | |
| 4 | Lens 2 | 2.587 | ASP | 0.329 | Plastic | 1.544 | 55.9 | 2.58 |
| 5 | | −2.922 | ASP | 0.030 | | | | |
| 6 | Lens 3 | 4.336 | ASP | 0.200 | Plastic | 1.640 | 23.3 | −4.73 |
| 7 | | 1.750 | ASP | 0.347 | | | | |
| 8 | Lens 4 | −1.628 | ASP | 0.587 | Plastic | 1.544 | 55.9 | 2.65 |
| 9 | | −0.862 | ASP | 0.030 | | | | |
| 10 | Lens 5 | 1.240 | ASP | 0.467 | Plastic | 1.583 | 30.2 | −3.59 |
| 11 | | 0.671 | ASP | 0.600 | | | | |
| 12 | IR-cut filter | Plano | | 0.210 | Glass | 1.517 | 64.2 | — |
| 13 | | Plano | | 0.263 | | | | |
| 14 | Image | Plano | | — | | | | |

Note:
Reference wavelength is 587.6 nm (d-line).

TABLE 18

Aspheric Coefficients

| Surface # | 2 | 3 | 4 | 5 | 6 |
|---|---|---|---|---|---|
| k = | −1.5921E+00 | −5.6478E+00 | −3.1193E+01 | −6.2488E+01 | −2.3690E+01 |
| A4 = | −1.0531E−01 | −1.2684E−01 | 5.2595E−02 | −6.8047E−01 | −5.6090E−01 |
| A6 = | 4.2554E−01 | −5.1754E−01 | −1.6362E+00 | 2.4493E+00 | 3.0073E+00 |
| A8 = | −3.2095E+00 | −4.5411E−01 | 4.9378E+00 | −1.0461E+01 | −1.4208E+01 |
| A10 = | 8.9735E+00 | 4.5484E−01 | −2.2197E+01 | 2.3917E+01 | 4.3931E+01 |
| A12 = | −1.5118E+01 | −3.6175E+00 | 4.2858E+01 | −2.4278E+01 | −7.4358E+01 |
| A14 = | 8.6661E+00 | 4.9796E+00 | −2.5842E+01 | 8.6819E+00 | 6.3250E+01 |
| A16 = | −3.4461E−11 | 3.2121E−12 | 1.8225E−12 | 3.7203E−11 | −2.1666E+01 |

| Surface # | 7 | 8 | 9 | 10 | 11 |
|---|---|---|---|---|---|
| k = | −9.7048E+00 | −4.4986E+00 | −2.8803E+00 | −5.5842E+00 | −3.6819E+00 |
| A4 = | −1.9692E−02 | 1.8240E−01 | −2.7685E−01 | −3.8801E−01 | −2.4490E−01 |
| A6 = | 3.0005E−01 | −7.7511E−01 | 2.8575E−01 | 4.4299E−01 | 2.2230E−01 |
| A8 = | −1.2233E+00 | 2.0632E+00 | 2.1056E−01 | −3.5282E−01 | −1.4113E−01 |
| A10 = | 3.0949E+00 | −3.0527E+00 | −1.2038E+00 | 1.9389E−01 | 5.7006E−02 |
| A12 = | −4.1415E+00 | 3.4451E+00 | 1.9922E+00 | −6.6636E−02 | −1.4116E−02 |
| A14 = | 2.5901E+00 | −2.4216E+00 | −1.3264E+00 | 1.2734E−02 | 1.9670E−03 |
| A16 = | −5.9421E−01 | 6.9321E−01 | 3.0698E−01 | −1.0381E−03 | −1.1950E−04 |

In the optical image capturing system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following conditions:

| 9th Embodiment | | | |
|---|---|---|---|
| f [mm] | 2.40 | (R3 + R4)/(R3 − R4) | −0.06 |
| Fno | 2.15 | (R5 + R6)/(R5 − R6) | 2.35 |
| HFOV [deg.] | 43.4 | f2/f4 | 0.97 |
| V2 − V3 | 32.6 | f2/f5 | −0.72 |
| V4/V5 | 1.85 | f/f4 + |f/f5| | 1.57 |
| T34/(T12 + T23 + T45) | 1.57 | FOV [deg.] | 86.8 |
| R1/R2 | 0.81 | | |

10th Embodiment

Figure 19:
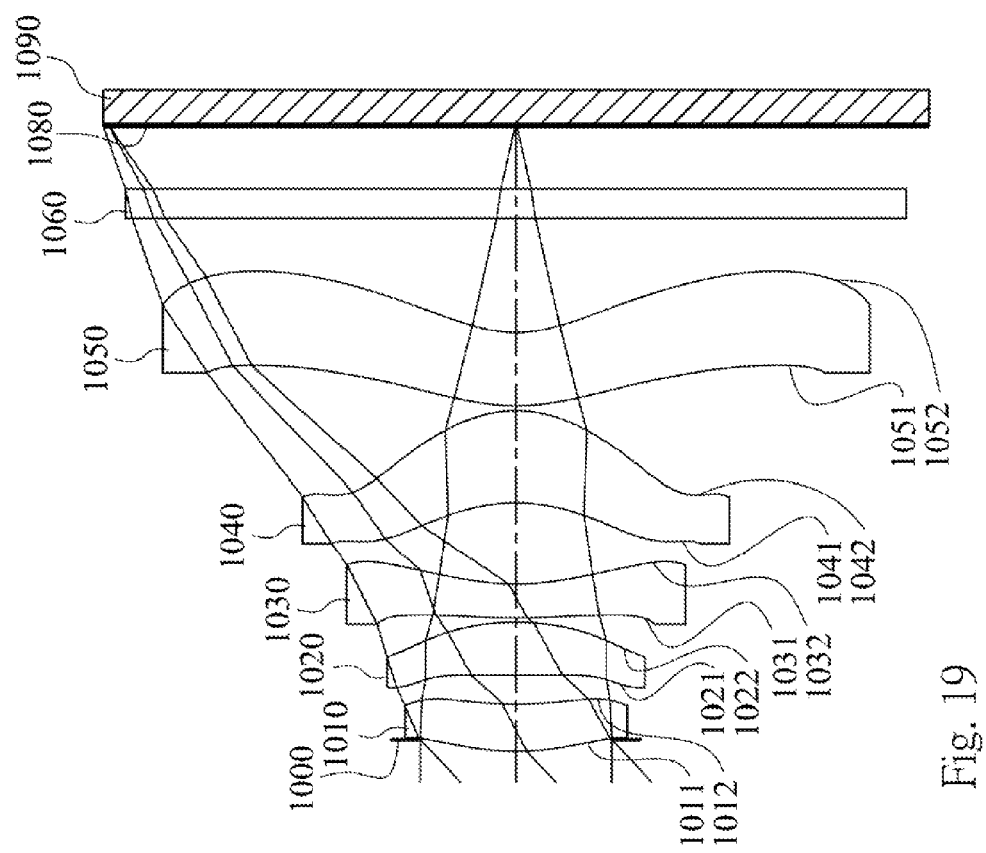
FIG. 19 is a schematic view of an image capturing device according to the 10th embodiment of the present disclosure.
Figure 20:
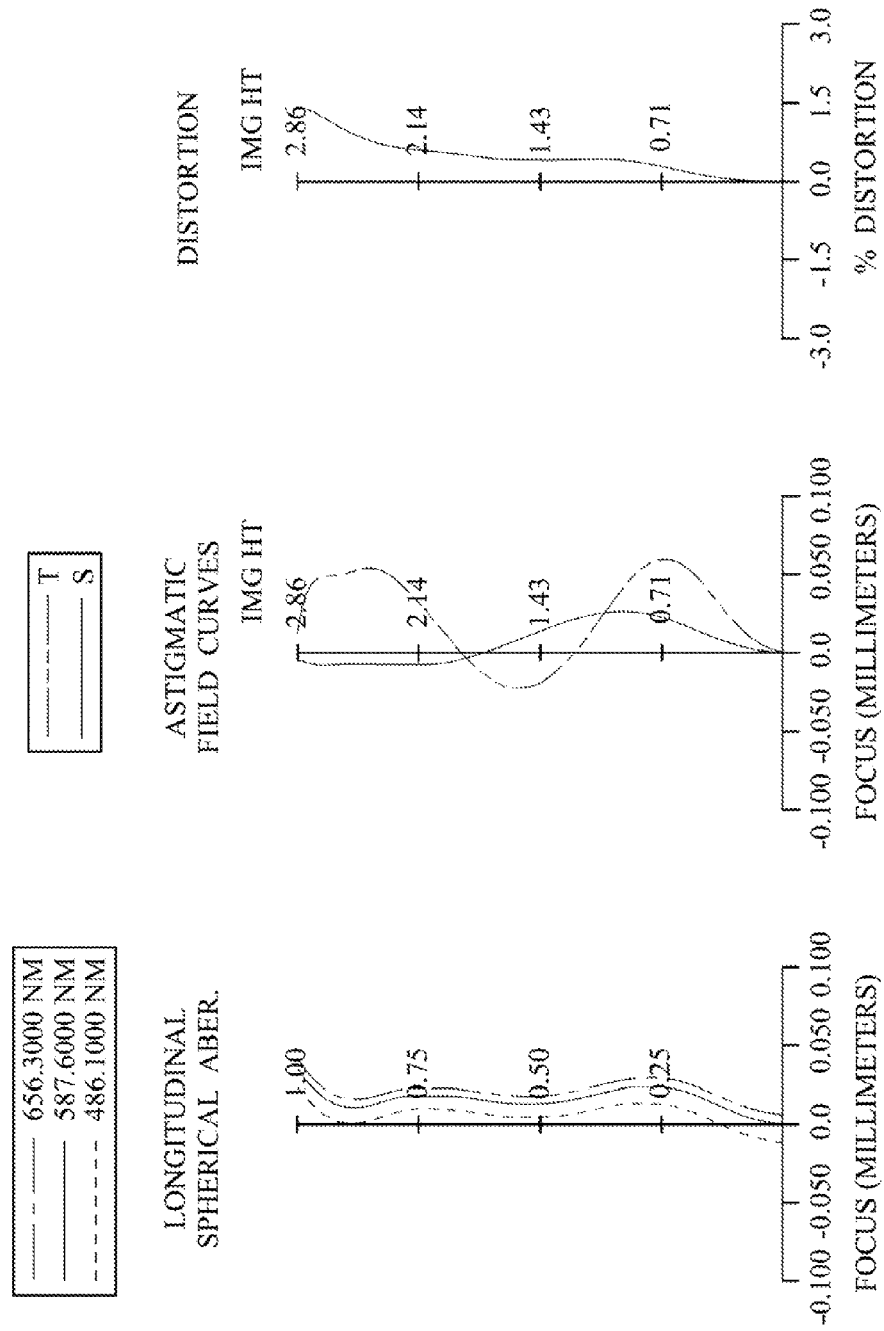
FIG. 20 shows spherical aberration curves, astigmatic field curves and a distortion curve of the image capturing device according to the 10th embodiment.

FIG. 19 is a schematic view of an image capturing device according to the 10th embodiment of the present disclosure. FIG. 20 shows, in order from left to right, spherical aberration curves, astigmatic field curves and a distortion curve of the image capturing device according to the 10th embodiment.

In FIG. 19, the image capturing device includes the optical image capturing system (not otherwise herein labeled) of the present disclosure and an image sensor 1090. The optical image capturing system includes, in order from an object side to an image side, an aperture stop 1000, a first lens element 1010, a second lens element 1020, a third lens element 1030, a fourth lens element 1040, a fifth lens element 1050, an IR-cut filter 1060 and an image plane 1080, wherein the optical image capturing system has a total of five lens elements (1010-1050) with refractive power.

The first lens element 1010 with positive refractive power has an object-side surface 1011 being convex in a paraxial region thereof and an image-side surface 1012 being concave in a paraxial region thereof, and is made of plastic material. The object-side surface 1011 and the image-side surface 1012 of the first lens element 1010 are aspheric. Furthermore, both of the object-side surface 1011 and the image-side surface 1012 of the first lens element 1010 have at least one inflection point.

The second lens element 1020 with positive refractive power has an object-side surface 1021 being convex in a paraxial region thereof and an image-side surface 1022 being convex in a paraxial region thereof, and is made of plastic material. The object-side surface 1021 and the image-side surface 1022 of the second lens element 1020 are aspheric. Furthermore, both of the object-side surface 1021 and the image-side surface 1022 of the second lens element 1020 have at least one inflection point.

The third lens element 1030 with negative refractive power has an object-side surface 1031 being convex in a paraxial region thereof and an image-side surface 1032 being concave in a paraxial region thereof, and is made of plastic material. The object-side surface 1031 and the image-side surface 1032 of the third lens element 1030 are aspheric. Furthermore, both of the object-side surface 1031 and the image-side surface 1032 of the third lens element 1030 have at least one inflection point.

The fourth lens element 1040 with positive refractive power has an object-side surface 1041 being concave in a paraxial region thereof and an image-side surface 1042 being convex in a paraxial region thereof, and is made of plastic material. The object-side surface 1041 and the image-side surface 1042 of the fourth lens element 1040 are aspheric. Furthermore, both of the object-side surface 1041 and the image-side surface 1042 of the fourth lens element 1040 have at least one inflection point.

The fifth lens element 1050 with negative refractive power has an object-side surface 1051 being convex in a paraxial region thereof and an image-side surface 1052 being concave in a paraxial region thereof, and is made of plastic material. The object-side surface 1051 and the image-side surface 1052 of the fifth lens element 1050 are aspheric. Furthermore, both of the object-side surface 1051 and the image-side surface 1052 of the fifth lens element 1050 have at least one inflection point.

The IR-cut filter 1060 is made of glass and located between the fifth lens element 1050 and the image plane 1080, and will not affect the focal length of the optical image capturing system. The image sensor 1090 is disposed on the image plane 1080 of the optical image capturing system.

The detailed optical data of the 10th embodiment are shown in Table 19 and the aspheric surface data are shown in Table 20 below.

TABLE 19

10th Embodiment
f = 2.99 mm, Fno = 2.23, HFOV = 43.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.081 | | | | |
| 2 | Lens 1 | 1.900 | ASP | 0.327 | Plastic | 1.544 | 55.9 | 11.34 |
| 3 | | 2.580 | ASP | 0.202 | | | | |
| 4 | Lens 2 | 14.629 | ASP | 0.376 | Plastic | 1.544 | 55.9 | 2.84 |
| 5 | | −1.710 | ASP | 0.030 | | | | |
| 6 | Lens 3 | 3.763 | ASP | 0.233 | Plastic | 1.640 | 23.3 | −4.82 |
| 7 | | 1.654 | ASP | 0.573 | | | | |
| 8 | Lens 4 | −1.203 | ASP | 0.646 | Plastic | 1.544 | 55.9 | 3.19 |
| 9 | | −0.845 | ASP | 0.034 | | | | |
| 10 | Lens 5 | 1.465 | ASP | 0.512 | Plastic | 1.640 | 23.3 | −4.64 |
| 11 | | 0.847 | ASP | 0.800 | | | | |
| 12 | IR-cut filter | Plano | | 0.210 | Glass | 1.517 | 64.2 | — |
| 13 | | Plano | | 0.443 | | | | |
| 14 | Image | Plano | | — | | | | |

Note:
Reference wavelength is 587.6 nm (d-line).

TABLE 20

Aspheric Coefficients

| Surface # | 2 | 3 | 4 | 5 | 6 |
|---|---|---|---|---|---|
| k = | −2.3307E+00 | −1.8467E+01 | −6.5988E+01 | −4.5542E+01 | −8.4284E+00 |
| A4 = | −4.7348E−02 | −3.4546E−02 | −7.1647E−02 | −1.0372E+00 | −3.9467E−01 |
| A6 = | −5.5253E−02 | −3.8829E−01 | −1.1107E+00 | 4.1528E+00 | 1.2175E+00 |
| A8 = | −2.3984E−01 | 4.1972E−02 | 4.6883E+00 | −1.2231E+01 | −3.0853E+00 |
| A10 = | 1.6622E−01 | −1.0375E+00 | −1.5502E+01 | 2.0247E+01 | 4.5868E+00 |
| A12 = | −2.2150E−01 | 1.5861E+00 | 2.4047E+01 | −1.6477E+01 | −3.3951E+00 |
| A14 = | | | −1.2644E+01 | 5.2008E+00 | 8.7897E−01 |

| Surface # | 7 | 8 | 9 | 10 | 11 |
|---|---|---|---|---|---|
| k = | −1.0366E+00 | −4.9143E+00 | −1.8044E+00 | −2.6461E+00 | −4.3909E+00 |
| A4 = | −3.4675E−01 | −8.6770E−02 | −3.9386E−03 | −1.9562E−01 | −9.4624E−02 |
| A6 = | 6.6259E−01 | −2.2387E−01 | −1.5637E−01 | 1.3303E−01 | 4.9582E−02 |
| A8 = | −1.1371E+00 | 8.9307E−01 | 2.0499E−01 | −5.6200E−02 | −1.7076E−02 |
| A10 = | 1.2324E+00 | −9.4054E−01 | −9.0516E−02 | 1.4578E−02 | 3.5924E−03 |

TABLE 20-continued

| Aspheric Coefficients | | | | | |
|---|---|---|---|---|---|
| A12 = | −7.2194E−01 | 4.9727E−01 | 5.8514E−02 | −2.2606E−03 | −4.6871E−04 |
| A14 = | 1.6638E−01 | −1.3803E−01 | −3.2092E−02 | 1.9699E−04 | 3.7015E−05 |
| A16 = | | 1.4812E−02 | 5.8779E−03 | −7.9878E−06 | −1.4741E−06 |

In the optical image capturing system according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following conditions:

| 10th Embodiment | | | |
|---|---|---|---|
| f [mm] | 2.99 | (R3 + R4)/(R3 − R4) | 0.79 |
| Fno | 2.23 | (R5 + R6)/(R5 − R6) | 2.57 |
| HFOV [deg.] | 43.2 | f2/f4 | 0.89 |
| V2 − V3 | 32.6 | f2/f5 | −0.61 |
| V4/V5 | 2.40 | f/f4 + |f/f5| | 1.58 |
| T34/(T12 + T23 + T45) | 2.15 | FOV [deg.] | 86.4 |
| R1/R2 | 0.74 | | |

11th Embodiment

Figure 21:
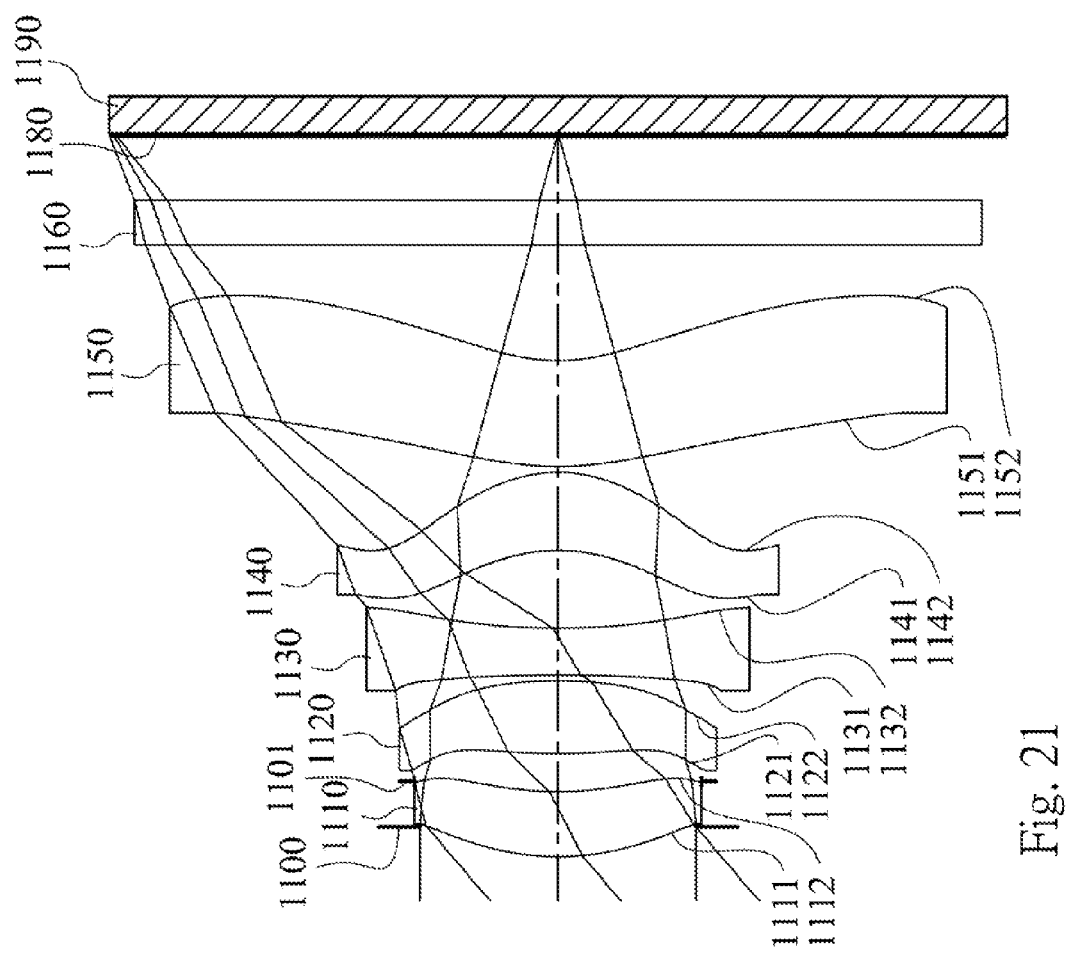
FIG. 21 is a schematic view of an image capturing device according to the 11th embodiment of the present disclosure.
Figure 22:
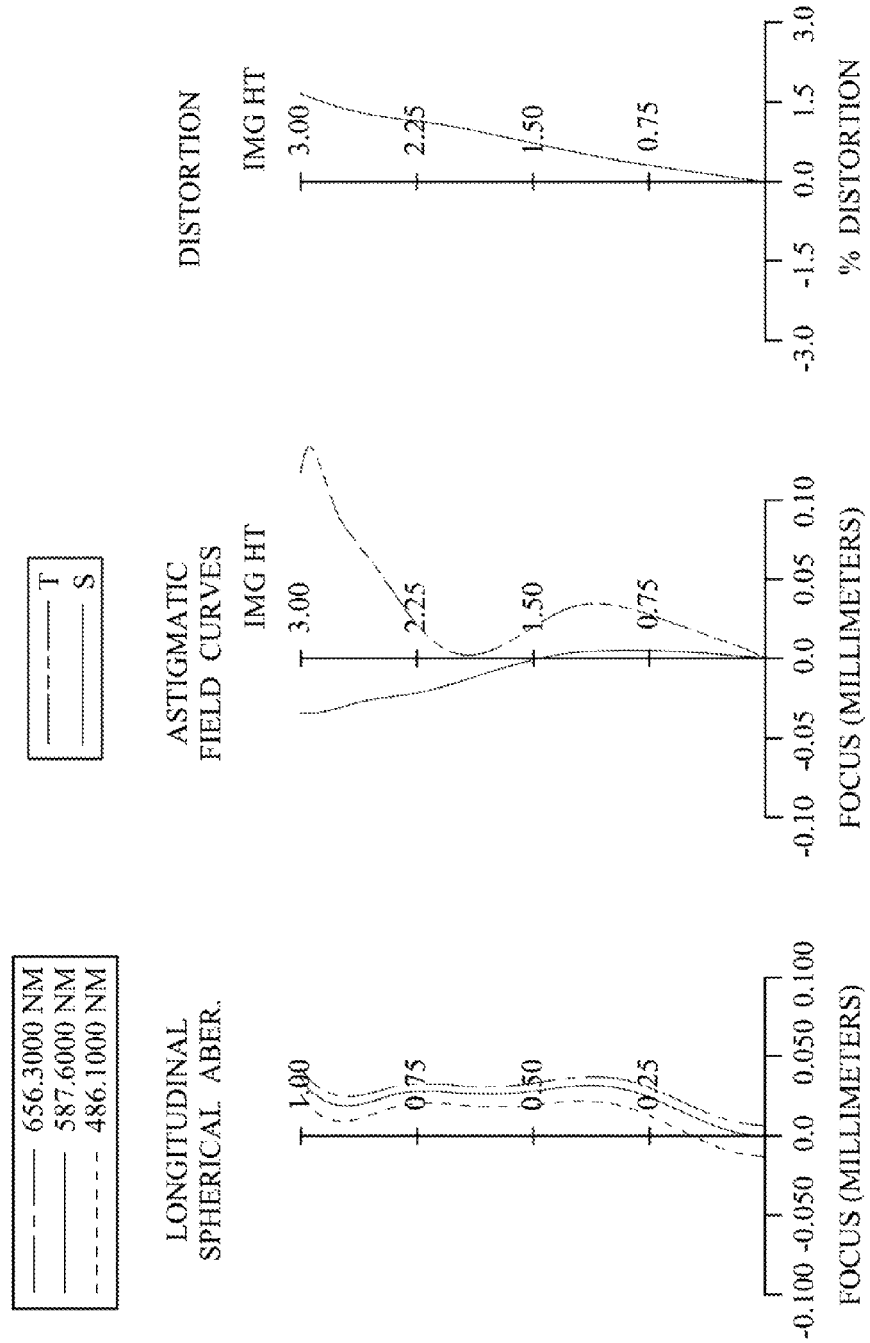
FIG. 22 shows spherical aberration curves, astigmatic field curves and a distortion curve of the image capturing device according to the 11th embodiment.

FIG. 21 is a schematic view of an image capturing device according to the 11th embodiment of the present disclosure. FIG. 22 shows, in order from left to right, spherical aberration curves, astigmatic field curves and a distortion curve of the image capturing device according to the 11 th embodiment.

In FIG. 21, the image capturing device includes the optical image capturing system (not otherwise herein labeled) of the present disclosure and an image sensor 1190. The optical image capturing system includes, in order from an object side to an image side, an aperture stop 1100, a first lens element 1110, a stop 1101, a second lens element 1120, a third lens element 1130, a fourth lens element 1140, a fifth lens element 1150, an IR-cut filter 1160 and an image plane 1180, wherein the optical image capturing system has a total of five lens elements (1110-1150) with refractive power.

The first lens element 1110 with positive refractive power has an object-side surface 1111 being convex in a paraxial region thereof and an image-side surface 1112 being concave in a paraxial region thereof, and is made of plastic material. The object-side surface 1111 and the image-side surface 1112 of the first lens element 1110 are aspheric. Furthermore, both of the object-side surface 1111 and the image-side surface 1112 of the first lens element 1110 have at least one inflection point.

The second lens element 1120 with positive refractive power has an object-side surface 1121 being convex in a paraxial region thereof and an image-side surface 1122 being convex in a paraxial region thereof, and is made of plastic material. The object-side surface 1121 and the image-side surface 1122 of the second lens element 1120 are aspheric. Furthermore, the object-side surface 1121 of the second lens element 1120 has at least one inflection point.

The third lens element 1130 with negative refractive power has an object-side surface 1131 being concave in a paraxial region thereof and an image-side surface 1132 being concave in a paraxial region thereof, and is made of plastic material. The object-side surface 1131 and the image-side surface 1132 of the third lens element 1130 are aspheric. Furthermore, the image-side surface 1132 of the third lens element 1130 has at least one inflection point.

The fourth lens element 1140 with positive refractive power has an object-side surface 1141 being concave in a paraxial region thereof and an image-side surface 1142 being convex in a paraxial region thereof, and is made of plastic material. The object-side surface 1141 and the image-side surface 1142 of the fourth lens element 1140 are aspheric. Furthermore, both of the object-side surface 1141 and the image-side surface 1142 of the fourth lens element 1140 have at least one inflection point.

The fifth lens element 1150 with negative refractive power has an object-side surface 1151 being convex in a paraxial region thereof and an image-side surface 1152 being concave in a paraxial region thereof, and is made of plastic material. The object-side surface 1151 and the image-side surface 1152 of the fifth lens element 1150 are aspheric. Furthermore, both of the object-side surface 1151 and the image-side surface 1152 of the fifth lens element 1150 have at least one inflection point.

The IR-cut filter 1160 is made of glass and located between the fifth lens element 1150 and the image plane 1180, and will not affect the focal length of the optical image capturing system. The image sensor 1190 is disposed on the image plane 1180 of the optical image capturing system.

The detailed optical data of the 11th embodiment are shown in Table 21 and the aspheric surface data are shown in Table 22 below.

TABLE 21

11th Embodiment
f = 3.45 mm, Fno = 1.85, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.200 | | | | |
| 2 | Lens 1 | 1.741 | ASP | 0.440 | Plastic | 1.544 | 55.9 | 11.25 |
| 3 | | 2.216 | ASP | 0.069 | | | | |
| 4 | Stop | Plano | | 0.184 | | | | |
| 5 | Lens 2 | 3.844 | ASP | 0.496 | Plastic | 1.544 | 55.9 | 3.25 |
| 6 | | −3.122 | ASP | 0.039 | | | | |

TABLE 21-continued

11th Embodiment
f = 3.45 mm, Fno = 1.85, HFOV = 40.4 deg.

| Surface # | | Curvature Radius | | Thickness | Material | Index | Abbe # | Focal Length |
|---|---|---|---|---|---|---|---|---|
| 7 | Lens 3 | −17.465 | ASP | 0.313 | Plastic | 1.640 | 23.3 | −5.91 |
| 8 | | 4.856 | ASP | 0.529 | | | | |
| 9 | Lens 4 | −1.175 | ASP | 0.529 | Plastic | 1.544 | 55.9 | 4.37 |
| 10 | | −0.911 | ASP | 0.039 | | | | |
| 11 | Lens 5 | 2.148 | ASP | 0.714 | Plastic | 1.640 | 23.3 | −5.55 |
| 12 | | 1.165 | ASP | 0.784 | | | | |
| 13 | IR-cut filter | Plano | | 0.300 | Glass | 1.517 | 64.2 | — |
| 14 | | Plano | | 0.440 | | | | |
| 15 | Image | Plano | | — | | | | |

Note:
Reference wavelength is 587.6 nm (d-line).
The effective radius of Surface 4 (stop) is 0.970 mm.

TABLE 22

Aspheric Coefficients

| Surface # | 2 | 3 | 5 | 6 | 7 |
|---|---|---|---|---|---|
| k = | −9.3942E−01 | −2.1943E+00 | −3.6002E+01 | 9.9982E−01 | −4.1842E+01 |
| A4 = | −3.1211E−02 | −4.9362E−02 | −1.9818E−02 | −1.6568E−01 | −1.2699E−01 |
| A6 = | 1.5483E−01 | −5.0574E−02 | −4.0772E−01 | 2.6401E−01 | 5.3293E−01 |
| A8 = | −5.4602E−01 | −1.8135E−01 | 8.8567E−01 | −7.6555E−01 | −1.5565E+00 |
| A10 = | 8.5978E−01 | 3.1746E−01 | −2.1175E+00 | 9.1230E−01 | 2.6215E+00 |
| A12 = | −6.8494E−01 | −4.2205E−01 | 2.1624E+00 | −3.9415E−01 | −2.3990E+00 |
| A14 = | 1.9532E−01 | 2.1909E−01 | −7.0794E−01 | 3.8054E−02 | 1.1137E+00 |
| A16 = | | | | | −2.1676E−01 |

| Surface # | 8 | 9 | 10 | 11 | 12 |
|---|---|---|---|---|---|
| k = | −1.0709E+00 | −2.3808E+00 | −3.2379E+00 | −3.6312E+00 | −5.9618E+00 |
| A4 = | −2.4064E−03 | 7.2122E−03 | −2.3740E−01 | −1.0153E−01 | −4.5279E−02 |
| A6 = | 6.6519E−02 | −2.2149E−01 | 2.7448E−01 | 6.6692E−02 | 2.0128E−02 |
| A8 = | −1.2509E−01 | 5.4451E−01 | −3.1416E−01 | −2.8969E−02 | −6.4760E−03 |
| A10 = | 9.0123E−02 | −3.9051E−01 | 3.6311E−01 | 8.0387E−02 | 1.2752E−03 |
| A12 = | −1.8427E−02 | 1.1739E−01 | −2.0978E−01 | −1.3400E−03 | −1.4676E−04 |
| A14 = | −1.3396E−02 | −1.2923E−02 | 5.5687E−02 | 1.2194E−04 | 9.1569E−06 |
| A16 = | 5.8233E−03 | | −5.5837E−03 | −4.6909E−06 | −2.5504E−07 |

In the optical image capturing system according to the 11th embodiment, the definitions of these parameters shown in the following table are the same as those stated in the 1st embodiment with corresponding values for the 11th embodiment. Moreover, these parameters can be calculated from Table 21 and Table 22 as the following values and satisfy the following conditions:

| 11th Embodiment | | | |
|---|---|---|---|
| f [mm] | 3.45 | (R3 + R4)/(R3 − R4) | 0.10 |
| Fno | 1.85 | (R5 + R6)/(R5 − R6) | 0.56 |
| HFOV [deg.] | 40.4 | f2/f4 | 0.74 |
| V2 − V3 | 32.6 | f2/f5 | −0.59 |
| V4/V5 | 2.40 | f/f4 + |f/f5| | 1.41 |
| T34/(T12 + T23 + T45) | 1.60 | FOV [deg.] | 80.8 |
| R1/R2 | 0.79 | | |

12th Embodiment

FIG. 23 is a schematic view of a mobile terminal 10 according to the 12th embodiment of the present disclosure. The mobile terminal 10 of the 12th embodiment is a smart phone, wherein the mobile terminal 10 includes an image capturing device 11. The image capturing device 11 includes an optical image capturing system (not otherwise herein labeled) according to the present disclosure and an image sensor (not otherwise herein labeled), wherein the image sensor is disposed on an image plane of the optical image capturing system.

13th Embodiment

FIG. 24 is a schematic view of a mobile terminal 20 according to the 13th embodiment of the present disclosure. The mobile terminal 20 of the 13th embodiment is a tablet personal computer, wherein the mobile terminal 20 includes an image capturing device 21. The image capturing device 21 includes an optical image capturing system (not otherwise herein labeled) according to the present disclosure and an image sensor (not otherwise herein labeled), wherein the image sensor is disposed on an image plane of the optical image capturing system.

14th Embodiment

FIG. 25 is a schematic view of a mobile terminal 30 according to the 14th embodiment of the present disclosure. The mobile terminal 30 of the 14th embodiment is a head-mounted display, wherein the mobile terminal 30 includes an image capturing device 31. The image capturing device 31 includes an optical image capturing system (not otherwise herein labeled) according to the present disclosure and an image sensor (not otherwise herein labeled), wherein the image sensor is disposed on an image plane of the optical image capturing system.

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image capturing system comprising, in order from an object side to an image side:
    a first lens element having an object-side surface being convex in a paraxial region thereof and an image-side surface being concave in a paraxial region thereof;
    a second lens element having positive refractive power;
    a third lens element with negative refractive power having an image-side surface being concave in a paraxial region thereof;
    a fourth lens element with positive refractive power having an image-side surface being convex in a paraxial region thereof; and
    a fifth lens element with negative refractive power having an image-side surface being concave in a paraxial region thereof, wherein both of an object-side surface and the image-side surface of the fifth lens element are aspheric, and the image-side surface of the fifth lens element has at least one inflection point;
    wherein the optical image capturing system has a total of five lens elements, an Abbe number of the fourth lens element is V4, an Abbe number of the fifth lens element is V5, a focal length of the optical image capturing system is f, a focal length of the second lens element is f2, a focal length of the fourth lens element is f4, a focal length of the fifth lens element is f5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$1.0 < f/f4 + |f/f5| < 2.0;$ $2.0 < V4/V5 < 3.5;$ $0 < f2/f4 < 1.20;$ and $1.05 < T34/(T12+T23+T45) < 4.0.$ 2. The optical image capturing system of claim 1, wherein an object-side surface and an image-side surface of the second lens element are aspheric, and an object-side surface and the image-side surface of the third lens element are aspheric.

3. The optical image capturing system of claim 2, wherein the fifth lens element has the object-side surface being convex in a paraxial region thereof.

4. The optical image capturing system of claim 3, wherein a curvature radius of the object-side surface of the third lens element is R5, a curvature radius of the image-side surface of the third lens element R6, and the following condition is satisfied:

$0 < (R5+R6)/(R5-R6) < 5.0.$

5. The optical image capturing system of claim 3, wherein the following condition is satisfied:

$1.5 < T34/(T12+T23+T45) < 4.0.$

6. The optical image capturing system of claim 3, wherein an Abbe number of the second lens element is V2, an Abbe number of the third lens element is V3, and the following condition is satisfied:

$28.0 < V2-V3 < 40.0.$

7. The optical image capturing system of claim 3, wherein a curvature radius of the object-side surface of the first lens element is R1, a curvature radius of the image-side surface of the first lens element is R2, and the following condition satisfied:

$0.7 < R1/R2 < 1.25.$

8. The optical image capturing system of claim 2, wherein the second lens element has the image-side surface being convex in a paraxial region thereof.

9. The optical image capturing system of claim 8, wherein the following condition is satisfied:

$-0.85 < f2/f5 < 0.$

10. The optical image capturing system of claim 8, wherein an f-number of the optical image capturing system is Fno, and the following condition is satisfied:

$1.5 < Fno \leq 2.25.$

11. The optical image capturing system of claim 8, wherein the following condition is satisfied:

$0.5 < f2/f4 < 1.0.$

12. The optical image capturing system of claim 1, wherein the second lens element has an object-side surface and an image-side surface, the third lens element has an object-side surface, the fourth lens element has an object-side surface, and at least four lens elements among the first through the fifth lens elements each has least one inflection point on at least one of the object-side surface and the image-side surface thereof.

13. An image capturing device, comprising:
    the optical image capturing system of claim 1; and
    an image sensor, wherein the image sensor is disposed on an image plane of the optical image capturing system.

14. A mobile terminal, comprising:
    the image capturing device of claim 13.

15. An optical image capturing system comprising, in order from an object side to an image side:
    a first lens element having an object-side surface being convex in a paraxial region thereof;
    a second lens element having positive refractive power;
    a third lens element with negative refractive power having an image-side surface being concave in a paraxial region thereof;
    a fourth lens element with positive refractive power having an image-side surface being convex in a paraxial region thereof; and a fifth lens element with negative refractive power having an image-side surface being concave in a paraxial region thereof, wherein both of an object-side surface and the image-side surface of the fifth lens element are aspheric, and the image-side surface of the fifth lens element has at least one inflection point;

wherein the optical image capturing system has a total of five lens elements, an Abbe number of the fourth lens element is V4, an Abbe number of the fifth lens element is V5, a focal length of the optical image capturing system is f, a focal length of the second lens element is f2, a focal length of the fourth lens element is f4, a focal length of the fifth lens element is f5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$1.0 < f/f4 + |f/f5| < 2.0$;

$2.0 < V4/V5 < 3.5$;

$0 < f2/f4 < 1.2$;

$1.05 < T34/(T12+T23+T45) < 4.0$; and $-0.95 < f2/f5 < 0$.

16. The optical image capturing system of claim 15, wherein the first lens element has an image-side surface being concave in a paraxial region thereof.

17. The optical image capturing system of claim 16, wherein an Abbe number of the second lens element V2, an Abbe number of the third lens element is V3, and the following condition is satisfied:

$28.0 < V2 - V3 < 40.0$.

18. The optical image capturing system of claim 15, wherein the following condition is satisfied:

$-0.85 < f2/f5 < 0$.

19. The optical image capturing system of claim 18, wherein a maximal field of view of the optical image capturing system is FOV, and the following condition is satisfied:

75 degrees < FOV < 105 degrees.

20. The optical image capturing system of claim 18, wherein a curvature radius of an object-side surface of the second lens element is R3, a curvature radius of an image-side surface of the second lens element is R4, and the following condition is satisfied:

$-0.5 < (R3+R4)/(R3-R4) < 2.0$.

21. The optical image capturing system of claim 15, wherein the following condition is satisfied:

$1.5 < T34/(T12+T23+T45) < 4.0$.

* * * * *